United States Patent
Xing et al.

(10) Patent No.: US 10,640,915 B2
(45) Date of Patent: May 5, 2020

(54) MOISTURE CONTROL FABRICS

(71) Applicant: DRYCO, INC., Brooklyn, NY (US)

(72) Inventors: Siyuan Xing, Newark, CA (US); Rachel Foote, San Leandro, CA (US)

(73) Assignee: DRYCO, INC., Brooklyn, NY (US)

( * ) Notice: Subject to any disclaimer, the term of this patent is extended or adjusted under 35 U.S.C. 154(b) by 0 days.

(21) Appl. No.: 16/378,752

(22) Filed: Apr. 9, 2019

(65) Prior Publication Data
US 2019/0234013 A1 Aug. 1, 2019

Related U.S. Application Data

(63) Continuation of application No. PCT/US2018/058462, filed on Oct. 31, 2018.
(Continued)

(51) Int. Cl.
*D06M 15/21* (2006.01)
*A41D 31/02* (2019.01)
(Continued)

(52) U.S. Cl.
CPC ............. *D06M 15/21* (2013.01); *A41B 17/00* (2013.01); *A41D 31/02* (2013.01); *B32B 5/02* (2013.01);
(Continued)

(58) Field of Classification Search
CPC .. A41D 31/02; D06M 15/21; D06M 2200/12; D10B 2401/021; D10B 2501/00;
(Continued)

(56) References Cited

U.S. PATENT DOCUMENTS 5,364,678 A * 11/1994 Lumb .................... A41D 31/02
428/96
5,735,145 A * 4/1998 Pernick .................... D04B 1/16
66/196

(Continued)

FOREIGN PATENT DOCUMENTS

WO       WO-0155500 A1 *  8/2001    ............. D03D 15/00
WO       WO2002075038         9/2002
(Continued)

OTHER PUBLICATIONS

Analysis of Comfort and Moisture Management Properties of Polyester/Milkweed Blended Plated Knitted Fabrics for Active Wear Applications; Karthik, T.;Journal of Industrial Textiles, v 47, n 5, p. 897-920, Jan. 1, 2018; ISSN: 15280837, E-ISSN: 15308057; DOI: 10.1177/1528083716676814; Publisher: SAGE Publications Ltd.

(Continued)

*Primary Examiner* — Jennifer A Steele
(74) *Attorney, Agent, or Firm* — Gottlieb, Rackman & Reisman, PC

(57) ABSTRACT

The present disclosure provides articles of manufacture with improved moisture control as well as methods of making such articles. In some embodiments, provided herein the article has a fabric with an outer hydrophobic surface and an inner surface with hydrophobic and hydrophilic regions where the hydrophilic regions can form a pattern, allowing moisture to collect and move through the pattern, and the hydrophobic regions prevent the whole inner surface from becoming moist and the outer hydrophobic regions does not show moisture. The fabric may be used to make garments. The entire inner surface of the garment may be patterned with hydrophilic patterns for partial absorption, and the entire outer surface of the garment is hydrophobic, thereby preventing perspiration from being seen from outside of the (Continued)

garment. Further provided herein are methods of making fabrics with improved moisture control including by printing or knitting.

14 Claims, 26 Drawing Sheets

Related U.S. Application Data

(60) Provisional application No. 62/580,345, filed on Nov. 1, 2017.

(51) Int. Cl.

| | | |
|---|---|---|
| *A41B 17/00* | (2006.01) | |
| *A41B 9/06* | (2006.01) | |
| *A41D 1/14* | (2006.01) | |
| *A41D 3/02* | (2006.01) | |
| *B32B 5/02* | (2006.01) | |
| *B32B 5/08* | (2006.01) | |
| *B32B 5/26* | (2006.01) | |
| *D03D 25/00* | (2006.01) | |
| *B32B 5/04* | (2006.01) | |
| *A41D 1/22* | (2018.01) | |
| *A41C 3/00* | (2006.01) | |
| *A41B 11/00* | (2006.01) | |
| *A41D 1/06* | (2006.01) | |

(52) U.S. Cl.
CPC ............... *B32B 5/04* (2013.01); *B32B 5/08* (2013.01); *B32B 5/26* (2013.01); *D03D 25/00* (2013.01); *A41B 9/06* (2013.01); *A41B 11/00* (2013.01); *A41B 2400/62* (2013.01); *A41B 2500/20* (2013.01); *A41C 3/00* (2013.01); *A41D 1/06* (2013.01); *A41D 1/14* (2013.01); *A41D 1/22* (2013.01); *A41D 3/02* (2013.01); *A41D 2500/20* (2013.01); *D06M 2200/12* (2013.01); *D10B 2401/021* (2013.01); *D10B 2501/00* (2013.01)

(58) Field of Classification Search
CPC ............ Y10T 442/20; Y10T 442/2484; Y10T 442/2492; Y10T 442/2164; Y10T 442/2172; Y10T 442/218; Y10T 442/2189; Y10T 442/2197; Y10T 442/2205; Y10T 442/2221; Y10T 442/223; Y10T 442/2238; Y10T 442/2246; Y10T 442/2254; Y10T 442/2262

See application file for complete search history.

(56) References Cited

U.S. PATENT DOCUMENTS

| | | | |
|---|---|---|---|
| 5,787,503 A * | 8/1998 | Murphy, III | A41D 1/04 2/90 |
| 7,008,887 B2 | 3/2006 | Rearick et al. | |
| 7,381,299 B2 | 6/2008 | Shannon | |
| 7,867,571 B2 | 1/2011 | Hubner | |
| 8,034,990 B2 | 10/2011 | Berland | |
| 8,127,575 B2 | 3/2012 | Burrow et al. | |
| 8,806,663 B2 | 8/2014 | White et al. | |
| 8,898,812 B2 | 12/2014 | Thompson et al. | |
| 9,828,705 B1 * | 11/2017 | Shiue | D04B 1/12 |
| 2004/0037963 A1 | 2/2004 | Hubner et al. | |
| 2006/0148356 A1 * | 7/2006 | Zhang | D04B 1/14 442/310 |
| 2007/0204375 A1 | 9/2007 | Issel | |
| 2008/0066211 A1 * | 3/2008 | Laugt | A41D 1/084 2/69 |
| 2011/0104448 A1 * | 5/2011 | Chung | A41D 31/02 428/172 |
| 2011/0179544 A1 | 7/2011 | Courvoisier | |
| 2014/0109282 A1 * | 4/2014 | White | A41D 1/00 2/69 |
| 2014/0352073 A1 | 12/2014 | Welspun | |
| 2016/0090669 A1 | 3/2016 | Shiue | |
| 2018/0002849 A1 | 1/2018 | Beattie et al. | |
| 2018/0179701 A1 * | 6/2018 | Loyan | D06M 23/16 |
| 2018/0371665 A1 | 12/2018 | Lin et al. | |

FOREIGN PATENT DOCUMENTS

| | | | | |
|---|---|---|---|---|
| WO | WO2007059590 | | 5/2007 | |
| WO | WO-2017013232 A1 * | 1/2017 | | D06M 23/16 |
| WO | WO2017035599 | | 3/2017 | |
| WO | WO2017117432 | | 7/2017 | |

OTHER PUBLICATIONS

The Comparison of the Thermal Behaviour of Leisure and Sports Clothing Using Conventional and New Textile Materials; Maria José Geraldes; Materials Science Forum, v 587-588, 2008; ISSN: 0255-5476; DOI: 10.4028/www.scientific.net/MSF.587-588.589; Publisher: Trans Tech Publications Ltd., Switzerland.
International Search Report and Written Opinion dated Mar. 5, 2019 for PCT/US18/58462.

\* cited by examiner

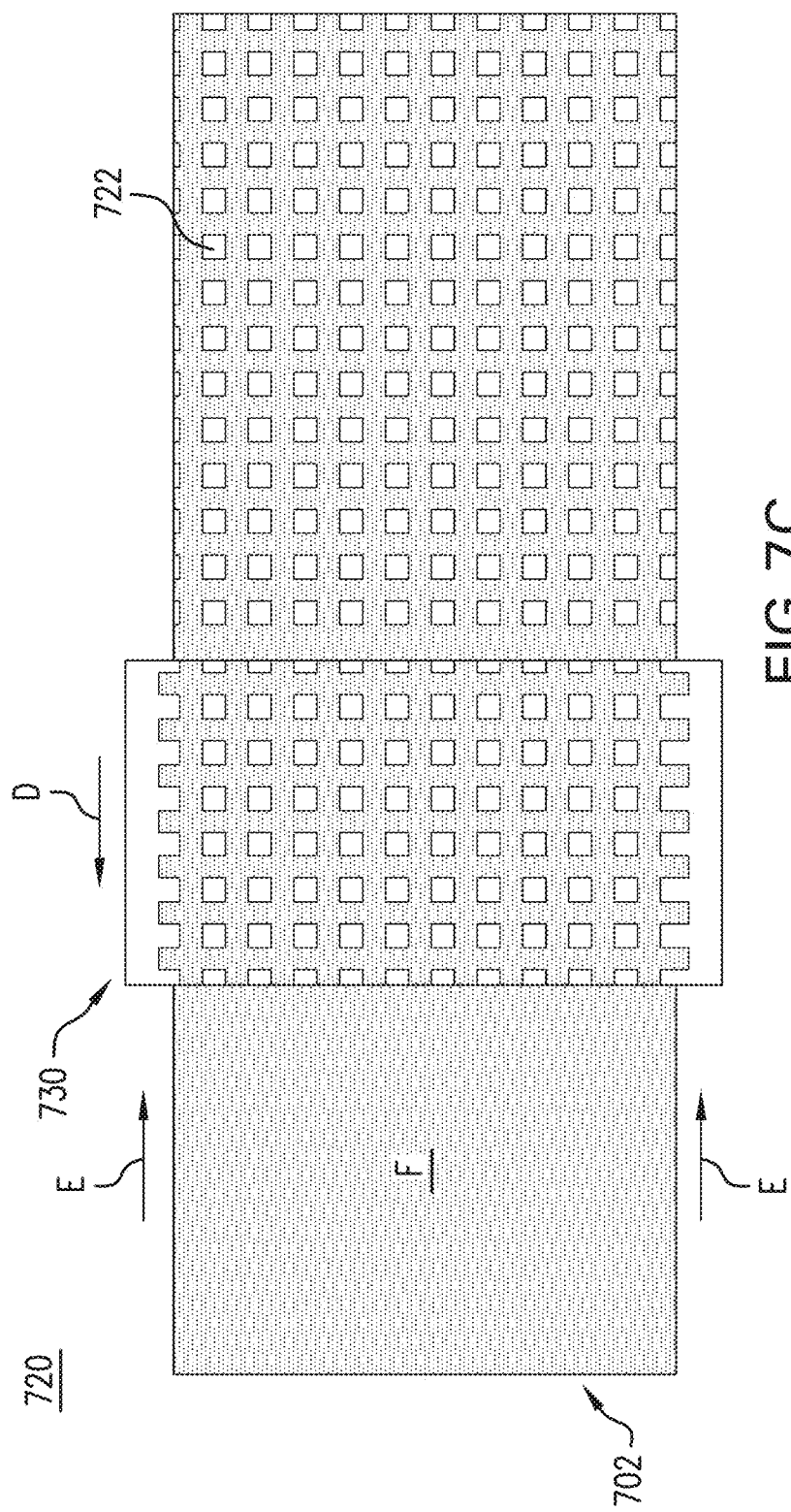

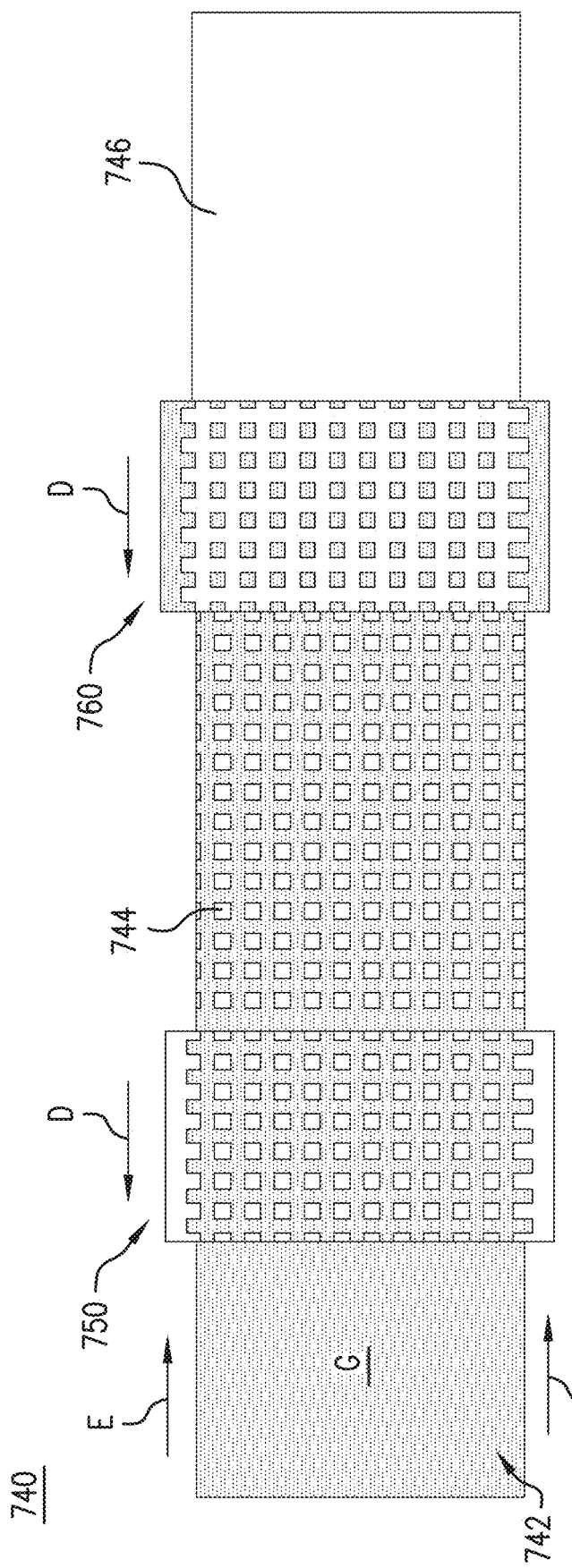
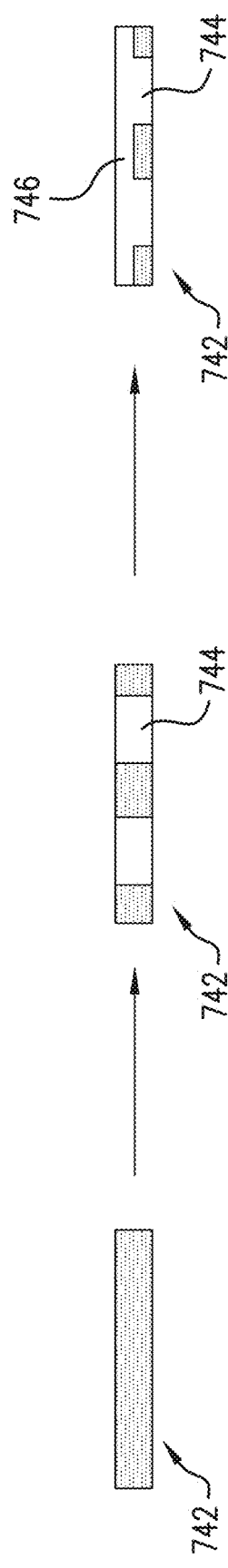
FIG. 7E
FIG. 7F

MOISTURE CONTROL FABRICS

CROSS-REFERENCE TO RELATED APPLICATIONS

This application claims priority under 35 U.S.C. § 365 to W.I.P.O. Patent Application No. PCT/US2018/058462, filed with the U.S. Receiving Office on Oct. 31, 2018, and under 35 U.S.C. § 119 to U.S. Provisional Patent Application No. 62/580,345, filed with the U.S.P.T.O. on Nov. 1, 2017, the contents of which are herein incorporated by reference in their entireties.

STATEMENT OF GOVERNMENT SUPPORT

This invention was made with U.S. Government support under Small Business Innovation Research (SBIR) Grant No. 1556133 awarded by the National Science Foundation of the United States. The U.S. Government has certain rights in this invention.

FIELD OF THE INVENTION

The present disclosure relates to articles of manufacture with improved moisture control, as well as methods related thereto.

BACKGROUND OF THE INVENTION

Perspiration is the primary means of thermoregulation for the human body, during which sweat (mainly composed of water) is secreted through the skin and evaporation of the fluid removes the heat from the surface underneath. During intensive activity, accumulated sweat can drastically increase the humidity level surrounding the skin, which can result in a very uncomfortable feeling unless sweat is efficiently removed. Moisture control fabrics can confine the moisture distribution in the fabric structure for various applications. Among them, one application is sweat-proof material that controls and prevents the moisture from showing on the external surface.

There are many methods currently utilized to sweat-proof materials. Common methods include the incorporation of a thin plastic film to prevent water movement across layers (e.g. Thompson Tee, www.thompsontee.com), but thin plastic films tend to inhibit the air flow through the materials and increase the rigidity of the fabric, which can cause wearer discomfort. An alternative method to using plastic materials is the use of hydrophobic coatings (i.e., fluoropolymer, silicone, and wax) to prevent liquid movement through the material. Coatings and fabric finishes provide a more breathable and comfortable alternative to plastic films. Technology such as 3xDRY (Schoeller Textile, see WO2002075038A3) implements hydrophobic treatments only on the outside surface of the material to prevent liquids from penetrating through the thickness of the fabric. The outside coating allows perspiration or other liquids from the inside surface to partially absorb through the thickness of the fabric but not become visible on the outside of the garment. However, the inside of this fabric can reach full saturation and the garment can cling to the wearer and cause discomfort.

Incorporating inherently hydrophobic materials into the overall structure is another method to create sweat-proof materials. In some fabric products, like Silic™ and Thread-Smith™, the fabric is completely non-absorbent (e.g., hydrophobic) and prevents liquid from passing through the fabric. However, this technology leads to wearer discomfort due to perspiration remaining on the skin surface.

Therefore, a need exists for articles with improved moisture control capacity. A fabric structure with sweat-proof function that can prevent full saturation, reduce garment cling and achieve quick drying properties would be ideal and largely improve wearer comfort. Such articles would be able to control the movement of moisture (e.g., a bodily fluid, such as sweat) from the inside to the outside to keep the outside dry while removing the moisture from the surface of the skin and keeping the wearer comfortable. These articles can find use, e.g., in fabrics for garments, sheets, and other accessories.

BRIEF SUMMARY OF THE INVENTION

To meet these and other demands, the present disclosure provides fabrics with improved moisture control capacity, as well as garments and methods of making related thereto. These fabrics have unique structures that control the movement of moisture, allowing the inner surface to remove moisture and keeping the moisture from accumulating on the outer surface. These properties provide fabrics that resist staining, reduce clinging to the body, and lessen drying times, as compared with existing materials.

In certain aspects, the present disclosure provides a fabric, comprising: (a) an outer surface comprising a hydrophobic material; and (b) an inner surface comprising: (i) one or more first regions, wherein the one or more first regions each comprise a hydrophobic material, and (ii) one or more second regions, wherein the one or more second regions each comprise a hydrophilic material, wherein the one or more first regions and the one or more second regions are different. In some embodiments, at least one of the one or more second regions is surrounded by at least one of the one or more first regions. In some embodiments, each of the one or more second regions is surrounded by one or more of the one or more first regions. In some embodiments, the one or more second regions are adjacent to the one or more first regions. In some embodiments, the one or more second regions are patterned in a geometric pattern or logo. In some embodiments, the one or more second regions form a plurality of repeated shapes surrounded by the one or more first regions. In some embodiments, the one or more second regions form a lattice. In some embodiments, at least one of the one or more first regions is surrounded by at least one of the one or more second regions. In some embodiments, each of the one or more first regions is surrounded by the one or more of the one or more second regions. In some embodiments, the one or more first regions are adjacent to the one or more second regions. In some embodiments, the one or more first regions are patterned in a geometric pattern or logo. In some embodiments, the one or more first regions are a plurality of repeated shapes surrounded by the one or more second regions. In some embodiments, the one or more first regions form a lattice. In some embodiments, the outer surface does not comprise the hydrophilic material of the one or more second regions. In some embodiments, a collective surface area of the one or more first regions and a collective surface area of the one or more second regions are substantially equivalent. In some embodiments, the proportion of the collective surface area of the one or more second regions to the surface area of the entire fabric is about 40% to about 95%. In some embodiments, the fabric further comprises an intermediate layer, wherein the intermediate layer is between the outer surface and the inner surface and affixed to one or both of the outer surface and the inner surface. In some embodiments, the intermediate layer comprises a hydrophobic material. In some embodiments, the intermediate layer comprises a hydrophilic material. In some embodiments, at least a portion of the hydrophobic material of the inner surface is in contact with at least a portion of the hydrophobic material of the outer surface. In some embodiments, the inner surface is interconnected with or affixed to the outer surface. In some embodiments, the inner surface is affixed to the outer surface by stitching, bonding, adhesion, lamination, or a combination thereof. In some embodiments, the hydrophilic material of the second region comprises 5% to 95% of the total thickness of the fabric. In some embodiments, the one or more second regions comprise 15% to 85% of the inner surface (e.g., by surface area). In some embodiments, the hydrophobic material of the outer surface resists a hydrostatic pressure of about 150 pa to about 3 kpa. In some embodiments, the hydrophobic material of the one or more first regions resists a hydrostatic pressure of about 150 pa to about 3 kpa. In some embodiments, the hydrophobic materials of the outer surface and the one or more first regions are different. In some embodiments, the hydrophobic materials of the outer surface and the one or more first regions are the same. In some embodiments, the hydrophobic material of the outer surface, the hydrophobic material of the one or more first regions, or both comprises a hydrophobic textile. In some embodiments, the hydrophobic textile is natural fiber, a synthetic fiber, or a blend thereof. In some embodiments, the hydrophobic textile is selected from the group consisting of polypropylene, polydimethylsiloxane, a fluoropolymer, olefin, or a blend thereof. In some embodiments, the hydrophobic material of the outer surface, the hydrophobic material of the one or more first regions, or both comprises a porous material with a hydrophobic coating. In some embodiments, the hydrophobic coating comprises fluoropolymer, silicone, hydrosilicone, fluoroacrylate, or wax. In some embodiments, the porous material is a textile, foam, polymer, or mesh. In some embodiments, the textile is a natural fiber, a synthetic fiber, or a blend thereof. In some embodiments, the textile is selected from the group consisting of cotton, hemp, rayon, coconut fiber, cellulose, wool, silk, bamboo, polyurethane, polypropylene, polyethylene, glass, acetate, polyester, nylon, lyocell, modal, poly-paraphenylene terephthalamide, elastin fiber, and any blend thereof. In some embodiments, the hydrophilic material of the one or more second regions comprises a hydrophilic textile. In some embodiments, the hydrophilic textile is a natural fiber, a synthetic fiber, or a blend thereof. In some embodiments, the hydrophilic textile is selected from the group consisting of cotton, rayon, coconut fiber, cellulose, silk, bamboo, and any blend thereof. In some embodiments, the hydrophilic material of the one or more second regions comprises a porous material with a hydrophilic coating. In some embodiments, the hydrophilic coating comprises hydrophilic silicone. In some embodiments, the porous material is a textile. In some embodiments, the textile is a natural fiber, a synthetic fiber, or a blend thereof. In some embodiments, the textile is selected from the group consisting of cotton, hemp, rayon, coconut fiber, cellulose, wool, silk, bamboo, polyurethane, polypropylene, polyethylene, glass, acetate, polyester, nylon, lyocell, modal, poly-paraphenylene terephthalamide, elastin fiber, and any blend thereof. In some embodiments, the fabric is a component of bedding, footwear, seat cover, outdoor gear, upholstery, or an accessory.

Further provided herein is a garment comprising a fabric according to any of the above embodiments. In some embodiments, the inner layer is configured to face the skin of the wearer of the garment. In some embodiments, the garment is a coat, a dress, a skirt, a sports bra, undergarment, pant, short, or sock. In some embodiments, the garment is a shirt. In some embodiments, the fabric is localized to one or more of an underarm area, a mid-back area, a lower-back area, a front chest area, a stomach area, and a shoulder area of the garment. In some embodiments, the one or more second regions form an interconnected lattice. In some embodiments, the one or more first regions form an interconnected lattice. In some embodiments, the fabric is localized to the mid-back area and/or to the lower-back area of the garment. In some embodiments, the fabric is surrounded by a hydrophobic material of the garment.

In certain aspects, the present disclosure provides a method of making a fabric, the method comprising: (a) providing a hydrophilic material comprising an outer and an inner surface; (b) screen printing a first hydrophobic material onto one or more portions of the inner surface; and (c) screen printing a second hydrophobic material onto the outer surface to cover the outer surface; thereby making a fabric comprising an outer surface comprising the second hydrophobic material, and an inner surface comprising one or more first regions comprising the first hydrophobic material, and one or more second regions comprising the hydrophilic material, wherein the one or more first regions and the one or more second regions are different. In other aspects, the present disclosure provides a method of making a fabric, the method comprising: (a) providing a hydrophilic material comprising an outer and an inner surface; (b) screen printing a first hydrophobic material onto one or more portions of the outer surface such that the first hydrophobic material penetrates through the hydrophilic material to generate an inner surface comprising one or more first regions comprising the first hydrophobic material and one or more second regions comprising the hydrophilic material; and (c) screen printing a second hydrophobic material onto the outer surface such that the second hydrophobic material penetrates through the hydrophilic material to generate an outer surface comprising the second hydrophobic material, thereby making a fabric comprising an outer surface comprising the second hydrophobic material, and an inner surface comprising one or more first regions comprising the first hydrophobic material, and one or more second regions comprising the hydrophilic material, wherein the one or more first regions and the one or more second regions are different. In some embodiments, the first and the second hydrophobic materials of the outer and inner surfaces contact each other. In some embodiments, the outer surface comprises about 50% of the total thickness of the fabric, and the inner surface comprises about 50% of the total thickness of the fabric. In some embodiments, the ratio of the thickness of the outer surface to the thickness of the inner surface is between about 0.1 to about 10. In some embodiments, the first and the second hydrophobic materials are the same. In some embodiments, the first and the second hydrophobic materials are different.

In other aspects, the present disclosure provides a method of making a fabric, the method comprising: (a) providing a first, a second, and a third hydrophilic material, wherein each of the first, second, and third hydrophilic materials comprises an outer and an inner surface;

(b) screen printing a hydrophobic material onto the outer surface of the first hydrophilic material to cover the outer surface; (c) screen printing a hydrophobic material onto one or more portions of the inner surface of the second hydrophobic philic material; (d) affixing the inner surface of the first hydrophilic material to the third hydrophilic material; and (e) affixing the outer surface of the second hydrophilic material to the third hydrophilic material; thereby making a fabric with three layers comprising an outer surface comprising a hydrophobic material, a middle hydrophilic layer, and an inner surface comprising one or more first regions comprising a hydrophobic material and one or more second regions comprising a hydrophilic material, wherein the one or more first regions and the one or more second regions are different. In some embodiments, the first hydrophilic material, the second hydrophilic material, and the third hydrophilic material comprise the same material. In some embodiments, the first hydrophilic material, the second hydrophilic material, and the third hydrophilic material comprise different hydrophilic materials. In some embodiments, the first hydrophilic material comprises about 30% to about 45% of the total thickness of the fabric, the second hydrophilic material comprises about 30% to about 45% of the total thickness of the fabric, and the third hydrophilic material comprises about 10% to about 40% of the total thickness of the fabric. In some embodiments, the ratio of the thickness of the first hydrophilic material to the thickness of the second hydrophilic material is between about 0.1 to about 10, and the ratio of the thickness of the second hydrophilic material to the thickness of the third hydrophilic material is between about 1 to about 5. In some embodiments, the first and third hydrophilic materials and the second and third hydrophilic materials are affixed by stitching, bonding, adhesion, lamination, or a combination thereof. In some embodiments, the hydrophobic materials in (b) and (c) are the same. In some embodiments, the hydrophobic materials in (b) and (c) are different. In some embodiments of any of the above embodiments, a collective surface area of the one or more first regions and a collective surface area of the one or more second regions are substantially equivalent.

In other aspects, the present disclosure provides a method of making a fabric, the method comprising: (a) providing a hydrophobic material comprising an outer and an inner surface; and (b) screen printing a hydrophilic material onto one or more portions of the inner surface; thereby making a fabric comprising an outer surface comprising a hydrophobic material, and an inner surface comprising one or more first regions comprising a hydrophobic material, and one or more second regions comprising a hydrophilic material, wherein the one or more first regions and the one or more second regions are different. In some embodiments, the outer surface comprises about 50% of the total thickness of the fabric, and the inner surface comprises about 50% of the total thickness of the fabric. In some embodiments, the ratio of the thickness of the outer surface to the thickness of the inner surface is between about 0.1 to about 10. In other aspects, the present disclosure provides a method of making a fabric, the method comprising: (a) providing a first hydrophobic material, a second hydrophobic material, and a first hydrophilic material, wherein the first and second hydrophobic materials and the first hydrophilic material each comprise an outer and an inner surface; (b) screen printing a second hydrophilic material onto one or more portions of the inner surface of the second hydrophobic material; (c) affixing the first hydrophilic material to the outer surface of the second hydrophobic material; and (d) affixing the first hydrophilic material to the first hydrophobic material; thereby making a fabric with three layers comprising an outer surface comprising a hydrophobic material, a middle hydrophilic layer, and an inner surface comprising one or more first regions comprising a hydrophobic material and one or more second regions comprising a hydrophilic material, wherein the one or more first regions and the one or more second regions are different. In some embodiments, the first hydrophilic material and the second hydrophobic material and the first hydrophilic material and the first hydrophobic material are affixed by stitching, bonding, adhesion, lamination, or a combination thereof. In some embodiments, the first hydrophobic material comprises about 30% to about 45% of the total thickness of the fabric, the middle hydrophilic layer comprises about 10% to about 40% of the total thickness of the fabric, and the third hydrophobic material comprises about 30% to about 45% of the total thickness of the fabric. In some embodiments, the ratio of the thickness of the first hydrophobic material to the thickness of the second hydrophobic material is between about 0.1 to about 10, and the ratio of the thickness of the second hydrophobic material to the thickness of the first hydrophilic material is between about 1 to about 5. In some embodiments of any of the above embodiments, a collective surface area of the one or more first regions and a collective surface area of the one or more second regions are substantially equivalent.

In other aspects, the present disclosure provides a method of making a fabric, the method comprising: (a) providing a material comprising an outer and an inner surface; (b) screen printing a hydrophobic material onto one or more first regions of the inner surface; (c) screen printing a hydrophilic material onto one or more second regions of the inner surface, wherein the one or more first regions and the one or more second regions are different; and (d) screen printing a hydrophobic material onto the outer surface; thereby making a fabric comprising an outer surface comprising a hydrophobic material, and comprising an inner surface comprising one or more first regions comprising a hydrophobic material, and one or more second regions comprising a hydrophilic material. In some embodiments, the hydrophobic materials of the outer and inner surfaces contact each other. In some embodiments, the outer surface comprises about 50% of the total thickness of the fabric, and the inner surface comprises about 50% of the total thickness of the fabric. In some embodiments, the ratio of the thickness of the outer surface to the thickness of the inner surface is between about 0.1 to about 10. In other aspects, the present disclosure provides a method of making a fabric, the method comprising: (a) providing a first material, a second material, and a hydrophilic material, wherein each of the first and second materials and the hydrophilic material comprise an inner and an outer surface; (b) screen printing a hydrophobic material onto one or more first regions of the inner surface of the second material; screen printing a hydrophilic material onto one or more second regions of the inner surface of the second material, wherein the one or more first regions and the one or more second regions are different; (d) screen printing a hydrophobic material onto the outer surface of the first material; (e) affixing the hydrophilic material to the inner surface of the first material; and (f) affixing the hydrophilic material to the outer surface of the second material; thereby making a fabric with three layers comprising an outer surface comprising a hydrophobic material, a middle hydrophilic layer, and an inner surface comprising one or more first regions comprising a hydrophobic material, and one or more second regions comprising a hydrophilic material, wherein the one or more first regions and the one or more second regions are different. In some embodiments, the hydrophobic materials in (b) and (d) comprise the same material. In some embodiments, the hydrophobic materials in (b) and (d) comprise different materials. In some embodiments, the first material comprises about 30% to about 45% of the total thickness of the fabric, the hydrophilic material comprises about 10% to about 40% of the total thickness of the fabric, and the second material comprises about 30% to about 45% of the total thickness of the fabric. In some embodiments, the ratio of the thickness of the first material to the thickness of the second material is between about 0.1 to about 10, and the ratio of the thickness of the second material to the thickness of the hydrophilic material is between about 1 to about 5. In some embodiments, the first and hydrophilic materials and the second and hydrophilic materials are affixed by stitching, bonding, adhesion, lamination, or a combination thereof. In some embodiments of any of the above, a collective surface area of the one or more first regions and a collective surface area of the one or more second regions are substantially equivalent.

In other aspects, the present disclosure provides a method of making a fabric, the method comprising; (a) knitting an outer layer of the fabric using a hydrophobic yarn; (b) knitting a first region of an inner layer of the fabric using a hydrophilic yarn; and (c) knitting a second region of the inner layer of the fabric using a hydrophobic yarn; thereby making a fabric comprising an outer surface comprising a hydrophobic material, and an inner surface comprising one or more first regions comprising a hydrophobic material, and one or more second regions comprising a hydrophilic material, wherein the one or more first regions and the one or more second regions are different. In some embodiments, the knitting of one or more of (a), (b), and (c) is warp knitting. In some embodiments, the knitting of one or more of (a), (b), and (c) is weft knitting. In some embodiments, the inner layer and the outer layer are connected using a hydrophobic tie-in yarn. In some embodiments, the inner layer is connected to the outer layer across their entire surfaces. In some embodiments, the inner layer is connected to the outer layer with individual loops at one or more discrete points. In some embodiments, the one or more discrete points are at one or more edges of the fabric. In some embodiments, a double needle circular knitting machine is used to knit a multi-layered structure, wherein the outer layer is knit on the dial using hydrophobic yarns; the inner layer is knit on the cylinder; each course of the inner layer uses either hydrophobic or hydrophilic yarns; the courses of the inner layer alternate hydrophobic and hydrophilic yarns to produce a pattern; and a hydrophobic tie-in yarn is used to connect the inner and outer fabric layers. In some embodiments, the first region of the inner layer and the second region of the inner layer of the fabric are knitted in alternating fashion.

In other aspects, the present disclosure provides a method of making a fabric, the method comprising: (a) weaving hydrophilic and hydrophobic yarns together to form a pattern with interspersed hydrophilic and hydrophobic portions; and (b) applying a hydrophobic coating to an outer surface of the woven pattern, thereby making a fabric comprising an outer layer comprising a hydrophobic material and an inner layer comprising a hydrophobic region interspersed with hydrophilic regions. In other aspects, the present disclosure provides a method of making a fabric, the method comprising: (a) providing a hydrophobic material; (b) providing a fabric comprising an inner surface comprising one or more first regions comprising a hydrophobic material and one or more second regions comprising a hydrophilic material, wherein the one or more first regions and the one or more second regions are different; and (c) affixing the hydrophobic material to the fabric, thereby making a fabric comprising an outer surface comprising a hydrophobic material, and an inner surface comprising one or more first regions comprising a hydrophobic material and one or more second regions comprising a hydrophilic material. In some embodiments of any of the above embodiments, the hydrophobic material is affixed to the fabric by stitching, bonding, adhesion, lamination, or a combination thereof.

In other aspects, the present disclosure provides a method of making a fabric, the method comprising: (a) providing a hydrophobic material and a hydrophilic material; (b) providing a fabric comprising an inner surface comprising one or more first regions comprising a hydrophobic material and one or more second regions comprising a hydrophilic material, wherein the one or more first regions and the one or more second regions are different; (c) affixing the hydrophobic material to the hydrophilic material; and (e) affixing the hydrophilic material to the fabric; thereby making a fabric comprising an outer surface comprising a hydrophobic material, and an inner surface comprising one or more first regions comprising a hydrophobic material and one or more second regions comprising a hydrophilic material. In some embodiments, the hydrophobic material and the fabric and the hydrophilic material and the fabric are affixed by stitching, bonding, adhesion, lamination, or a combination thereof. In some embodiments, the hydrophobic material of the outer surface, the hydrophobic material of the one or more first regions, or both comprises a hydrophobic textile. In some embodiments, the hydrophobic textile is natural fiber, a synthetic fiber, or a blend thereof.

In some embodiments of any of the above embodiments, the hydrophobic textile is selected from the group consisting of polypropylene, polydimethylsiloxane, a fluoropolymer, olefin, or a blend thereof. In some embodiments, the hydrophobic material of the outer surface, the hydrophobic material of the one or more first regions, or both comprises a porous material with a hydrophobic coating. In some embodiments, the hydrophobic coating comprises fluoropolymer, silicone, hydrosilicone, fluoroacrylate, or wax. In some embodiments, the porous material is a textile, foam, polymer, or mesh. In some embodiments, the textile is a natural fiber, a synthetic fiber, or a blend thereof. In some embodiments, the textile is selected from the group consisting of cotton, hemp, rayon, coconut fiber, cellulose, wool, silk, bamboo, polyurethane, polypropylene, polyethylene, glass, acetate, polyester, nylon, lyocell, modal, poly-paraphenylene terephthalamide, elastin fiber, and any blend thereof.

In some embodiments of any of the above embodiments, the hydrophilic material of the one or more second regions comprises a hydrophilic textile. In some embodiments, the hydrophilic textile is a natural fiber, a synthetic fiber, or a blend thereof. In some embodiments, the hydrophilic textile is selected from the group consisting of cotton, rayon, coconut fiber, cellulose, silk, bamboo, and any blend thereof. In some embodiments, the hydrophilic material of the one or more second regions comprises a porous material with a hydrophilic coating. In some embodiments, the hydrophilic coating comprises hydrophilic silicone. In some embodiments, the porous material is a textile. In some embodiments, the textile is a natural fiber, a synthetic fiber, or a blend thereof. In some embodiments, the textile is selected from the group consisting of cotton, hemp, rayon, coconut fiber, cellulose, wool, silk, bamboo, polyurethane, polypropylene, polyethylene, glass, acetate, polyester, nylon, lyocell, modal, poly-paraphenylene terephthalamide, elastin fiber, and any blend thereof.

In some embodiments of any of the above embodiments, the fabric is a component of bedding, footwear, a seat cover, outdoor gear, upholstery, or accessory.

In other aspects, the present disclosure provides a fabric made by the method according to any one of the above embodiments.

In other aspects, the present disclosure provides a garment comprising the fabric made by the method according to any one of the above embodiments. In some embodiments, the inner layer is configured to face the skin of a wearer of the garment. In some embodiments, the garment is a sports bra, undergarment, shirt, undershirt, coat, dress, skirt, pant, short, or sock.

It is to be understood that one, some, or all of the properties of the various embodiments described above and herein can be combined to form other embodiments of the present invention. These and other aspects of the present disclosure will become apparent to one of skill in the art. These and other embodiments of the present disclosure are further described by the detailed description that follows.

BRIEF DESCRIPTION OF THE DRAWINGS

FIGS. 7A-7F illustrate two exemplary processes for producing fabrics with improved moisture management by printing, in accordance with some embodiments. FIGS. 7A & 7B show top (FIG. 7A) and cross-sectional views (FIG. 7B) of step 700 in the first process. FIGS. 7C & 7D show top (FIG. 7C) and cross-sectional views (FIG. 7D) of step 720 in the first process. FIGS. 7E & 7F show top (FIG. 7E) and cross-sectional views (FIG. 7F) of step 740 in the second process.

DETAILED DESCRIPTION

I. Articles with Improved Moisture Control

Figure 1A:
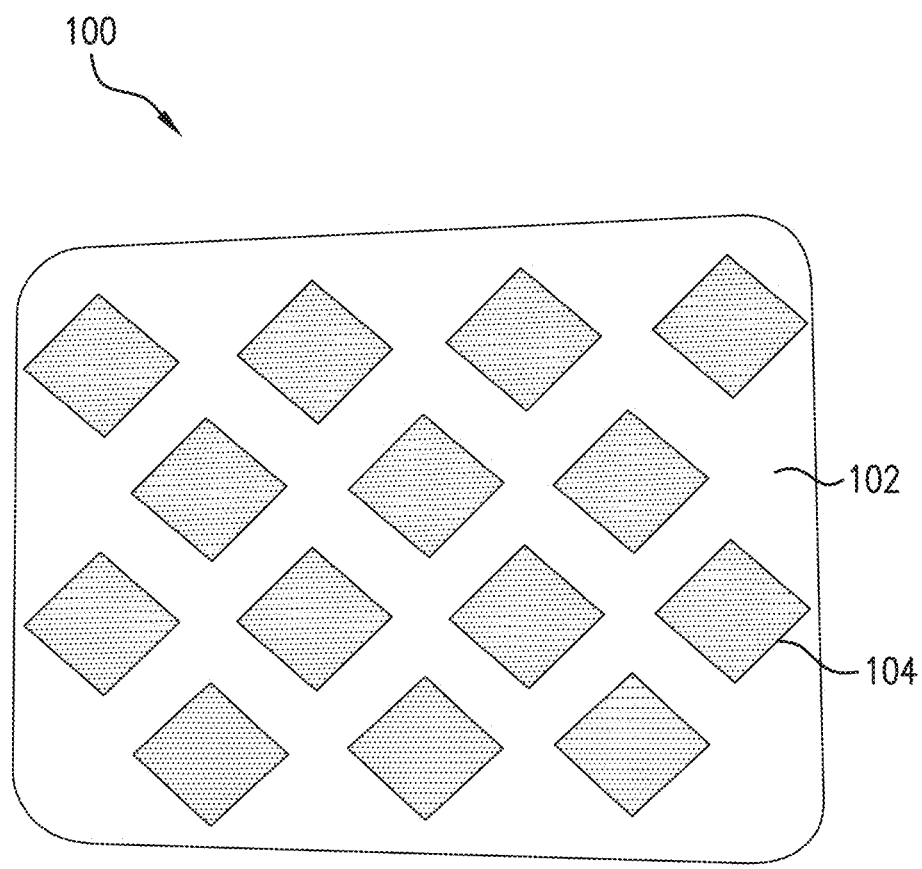
FIGS. 1A & 1B show inner surfaces of fabrics with improved moisture control, in accordance with some embodiments.

Certain aspects of the present disclosure relate to articles of manufacture with improved moisture control. In some embodiments, an article of the present disclosure comprises a fabric with an outer hydrophobic surface and an inner surface with hydrophobic and hydrophilic regions. For example, the hydrophilic regions can form a connected pattern, allowing moisture to collect and move through the pattern, while the hydrophobic regions prevent the whole inner surface from becoming moist, and the outer hydrophobic region does not show moisture. Without wishing to be bound by theory, it is thought that such a structure allows for fabrics and other materials to conduct a fluid (e.g., sweat or another bodily fluid) along regions on the inside of the fabric while keeping some regions on the inside of the fabric dry, as well as keeping the entirety of the outside of the fabric completely dry, no matter how much fluid is absorbed or removed by the fabric internally. By using an inner surface patterned with hydrophobic and hydrophilic regions, the fabrics of the present disclosure are further thought to provide a means of absorbing perspiration without full saturation on the internal surface of the fabric. This structure is thought to mitigate and/or eliminate problems with existing materials that rely upon external hydrophobic barriers and internal non-patterned hydrophilic surfaces or entirely hydrophobic materials (e.g., to prevent the appearance of moisture on the outer surface of a garment), such as accumulation of wetness throughout inner hydrophilic layers and on the wearer's skin. For example, the fabrics of the present disclosure can reduce cling to the wearer's body when used in a garment as well as facilitate quicker drying of a garment. Without wishing to be bound by theory, it is also thought that such a structure can resist staining (e.g., from beverages or condiments) because the outside of the fabric has a continuous and completely hydrophobic surface that repels and resists liquid absorption by the fabric.

In some embodiments, the articles of the present disclosure comprise fabrics with an outer surface comprising a hydrophobic material; and an inner surface comprising: one or more first regions comprising a hydrophobic material, and one or more second regions comprising a hydrophilic material. In some embodiments, the one or more first regions and the one or more second regions are different. The terms "outer" and "inner" as used herein refer to an outer surface facing an external environment (e.g., rain or sun) and an inner surface facing an element or area to be shielded by the article from the external environment, such as a wearer's skin, interior space, or dry material. For example, if the article is part of a garment diaper, pad, wound dressing, bed sheet, or the like, the outer direction faces the external environment and the inner direction faces the skin of the wearer. If the article is part of a piece of outdoor gear, the outer direction faces the external environment and the inner direction faces the user while the gear is in use.

In some embodiments, at least one of the one or more second regions (e.g., comprising a hydrophilic material) is surrounded by at least one of the one or more first regions (e.g., comprising a hydrophobic material). In other embodiments, each of the one or more second regions is surrounded by one or more of the one or more first regions. In further embodiments, the one or more second regions are adjacent to the one or more first regions. This concept is illustrated in FIG. 1A.

The inner surface of exemplary fabric 100 with a pattern of discrete (i.e. not connected) shapes is shown in FIG. 1A. Fabric 100 includes a pattern on the inner surface with regions 102 and 104. The inner surface pattern comprises hydrophobic region 102 surrounding multiple hydrophilic regions 104. The regions 104 are individual diamonds that are distributed at regular intervals over the inner surface of fabric 100. Each of the hydrophilic regions 104 is surrounded by the hydrophobic region 102. In addition, each of the hydrophilic regions 104 is adjacent to the hydrophobic region 102. In this example, moisture in contact with one or more of the hydrophilic region(s) 104 will be absorbed into the structure, while moisture in contact with the hydrophobic region 102 will either roll off of the material or migrate to one or more of the hydrophilic region(s) 104.

Figure 1B:
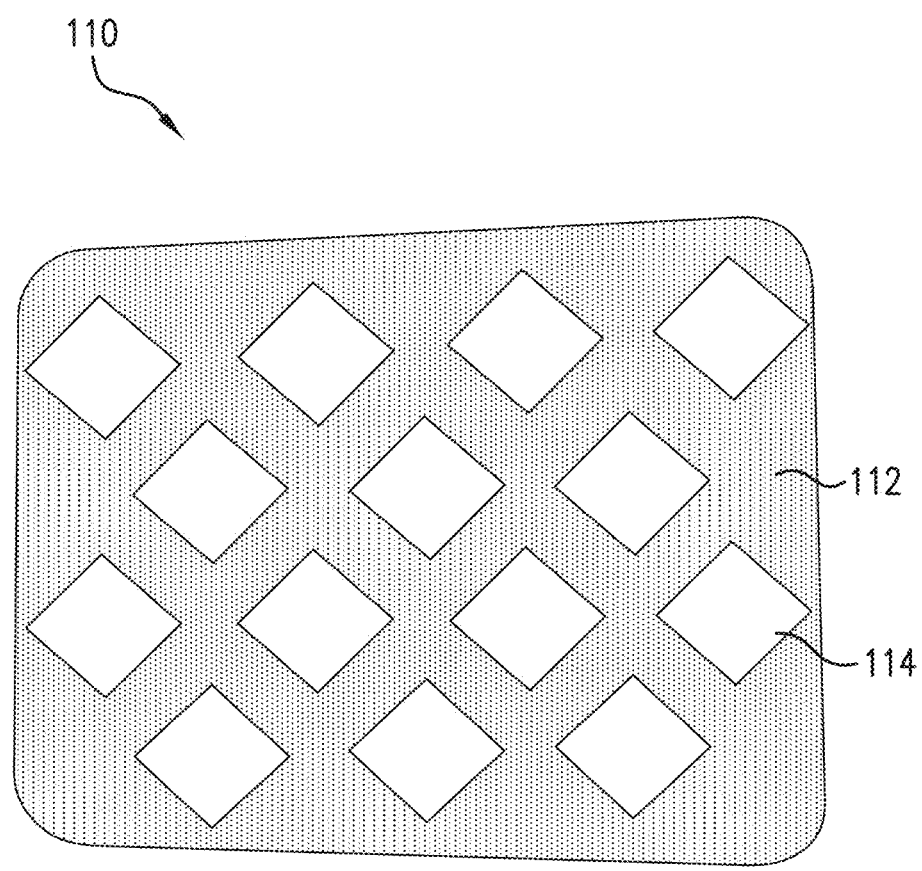

In some embodiments, at least one of the one or more first regions (e.g., comprising a hydrophobic material) is surrounded by at least one of the one or more second regions (e.g., comprising a hydrophilic material). In other embodiments, each of the one or more first regions is surrounded by the one or more second regions. In further embodiments, the one or more first regions are adjacent to the one or more second regions. This concept is illustrated in FIG. 1B, wherein the connected hydrophilic second regions form a fluidic flow network. This network utilizes capillary forces of water, surface tension gradients, and downward gravitational forces, and can be patterned such that liquid can be moved away from source points. Further, the larger hydrophilic area creates a greater surface area of evaporation per same amount of perspiration, while the interspersed hydrophobic areas also reduce dry time.

The inner surface of exemplary fabric 110 is shown in FIG. 1B. Fabric 110 includes a pattern on the inner surface with regions 112 and 114. The inner surface pattern comprises one hydrophilic region 112 surrounding multiple hydrophobic regions 114. The regions 114 are individual diamonds that are distributed at intervals over the inner surface of fabric 110. Each of the hydrophobic regions 114 is surrounded by the hydrophilic region 112. In addition, each of the hydrophobic regions 114 is adjacent to the hydrophilic region 112. In this example, the connected hydrophilic region 112 will direct liquid movement, and the adjacent hydrophobic regions 114 will facilitate quicker drying times.

In some embodiments, at least a portion of the one or more hydrophobic regions is in contact with at least a portion of the hydrophobic material of the outer surface. In other embodiments, the outer surface excludes or does not comprise the hydrophilic material of the one or more second regions of the inner surface. This concept is illustrated in FIG. 2.

Figure 2:
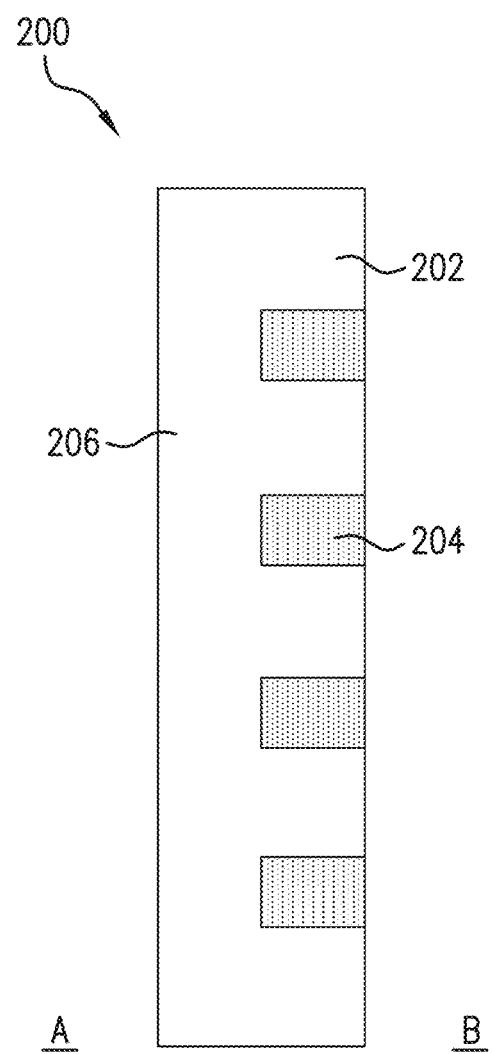
FIG. 2 shows a cross-sectional view of a fabric with improved moisture control, in accordance with some embodiments.

FIG. 2 shows a cross-section of exemplary fabric 200, including an inner B surface with regions 202 and 204, and an outer A surface with region 206. Region 202 comprises a hydrophobic material of the present disclosure, and region 204 comprises a hydrophilic material of the present disclosure. The hydrophobic regions 202 of the inner B surface are in contact with portions of the hydrophobic 206 outer A surface. Although the hydrophilic regions 204 of the inner surface are also in contact with outer surface 206, the 204 regions do not completely penetrate fabric 200, and therefore are not included in the outer surface 206. In this exemplary fabric 200, the hydrophilic regions 204 comprise about 50% of the total thickness of the fabric, and the hydrophobic outer surface 206 comprises the remaining about 50% of the total thickness of the fabric.

In some embodiments, the inner surface of the fabric is interconnected with or affixed to the outer surface of the fabric. In some embodiments, the fabric is composed of two layers, wherein the first layer (e.g., an outer surface) faces the external environment and the second layer (e.g., an inner surface) faces the skin of the wearer. In some embodiments the inner and outer surface are affixed across their entire surfaces. In other embodiments, the inner and outer surfaces are affixed around the edges, allowing some separation and movement in the areas where the surfaces are not affixed. In further embodiments the inner and outer surfaces are affixed at one or more points, which can be regularly spaced, irregularly spaced, spaced close together, spaced far apart, etc. Any suitable means for affixing known in the art can be used. In some embodiments, the inner surface or layer is affixed to the outer surface or layer by stitching, bonding, adhesion, lamination, or a combination thereof. Both affixing around the edges and affixing at discrete points allows some separation of the surfaces and movement in the areas where the surfaces are not affixed. Without wishing to be bound by theory, it is thought that fabrics composed of separate layers provide enhanced moisture control performance.

Figure 3A:
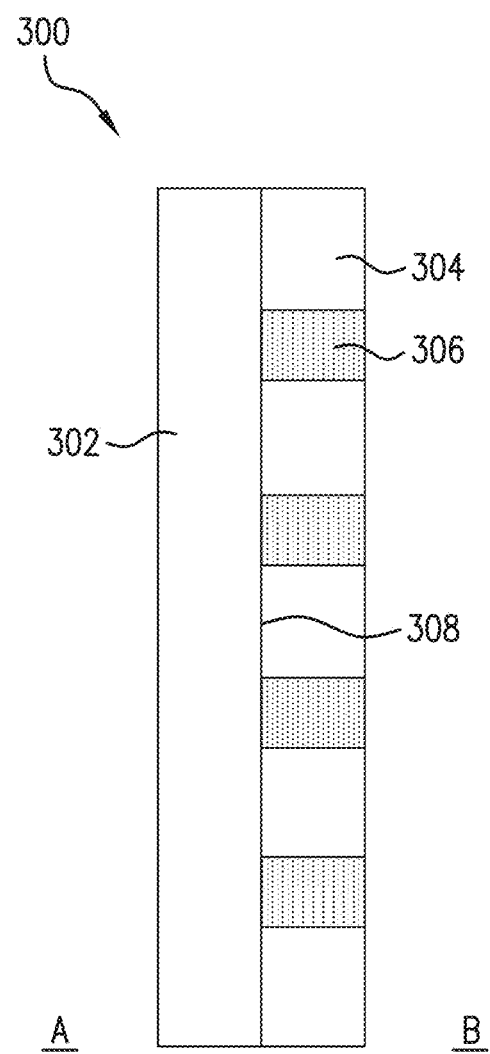
FIGS. 3A-3D show cross-sectional views of a multi-layered fabric with improved moisture control, in accordance with some embodiments.

FIG. 3A shows a cross-section of exemplary fabric 300 with two layers. Layer 302 is hydrophobic, making the outer A surface of the fabric hydrophobic. The second layer has both hydrophobic regions 304 and hydrophilic regions 306 on the inner B surface. Both regions 304 and 306 penetrate the second layer and are in contact with the hydrophobic first layer 302. In this example, the two layers are affixed across their entire surfaces at affixture 308.

Figure 3B:
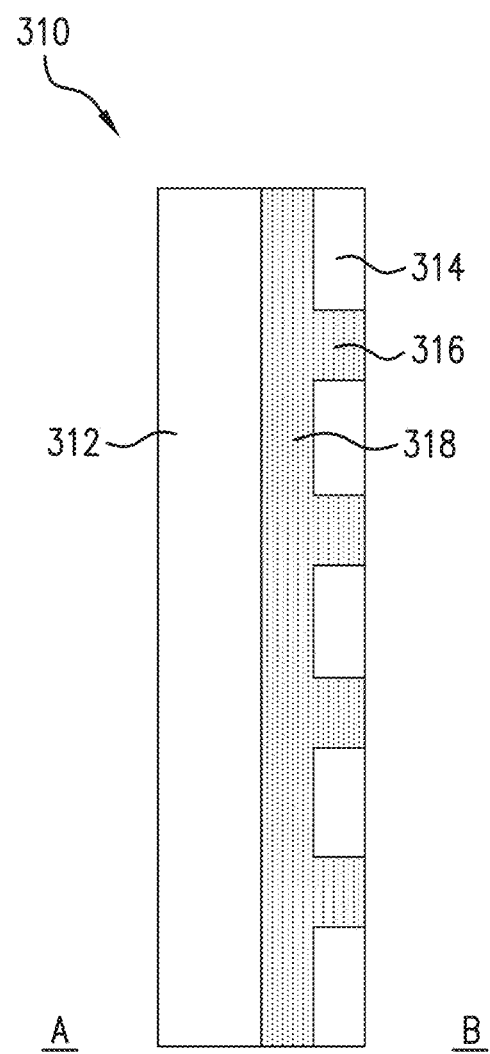

Another exemplary fabric 310 is illustrated in FIG. 3B. The first layer 312 is hydrophobic, making the outer A surface of the fabric hydrophobic. The second, inner B layer has hydrophobic regions 314, hydrophilic regions 316, and hydrophilic region 318. In this example, the two layers are affixed across their entire surfaces. The regions 314 and 316 are present on the inner surface of the second layer, and penetrate partially through the thickness of the fabric. Region 318 is on the entirety of the outer surface of the second layer, and also penetrates partially through the thickness of the fabric. Neither of the materials of 316 and 318 are included in hydrophobic layer 312. The regions 316 form an interconnected area with the region 318 that results in patterned channels of hydrophilic areas in the second layer. In this example, these channels spread moisture away from the source point, allow movement of moisture throughout the fabric to prevent areas of high moisture density, and facilitate quicker drying times. The hydrophobic regions 314 are also in contact with the region 318, and the first hydrophobic layer 312 is only in contact with the region 318 of the second layer. In some embodiments, the first layer 312 of the fabric is hydrophobic (optionally, entirely hydrophobic). In some embodiments, the second layer of the fabric has patterned hydrophilic regions comprising regions 316 on the inner surface of the second layer connected to region 318 on the outer surface of the second layer. In some embodiments, the partial absorption on the inner surface of the second layer allows moisture to spread away from the source point and toward the hydrophilic outer surface of the second layer. Without wishing to be bound by theory, it is thought that this movement of moisture through the second layer and along connected channels both prevents areas of high moisture density on the second layer and helps facilitate quicker drying times.

Figure 3C:
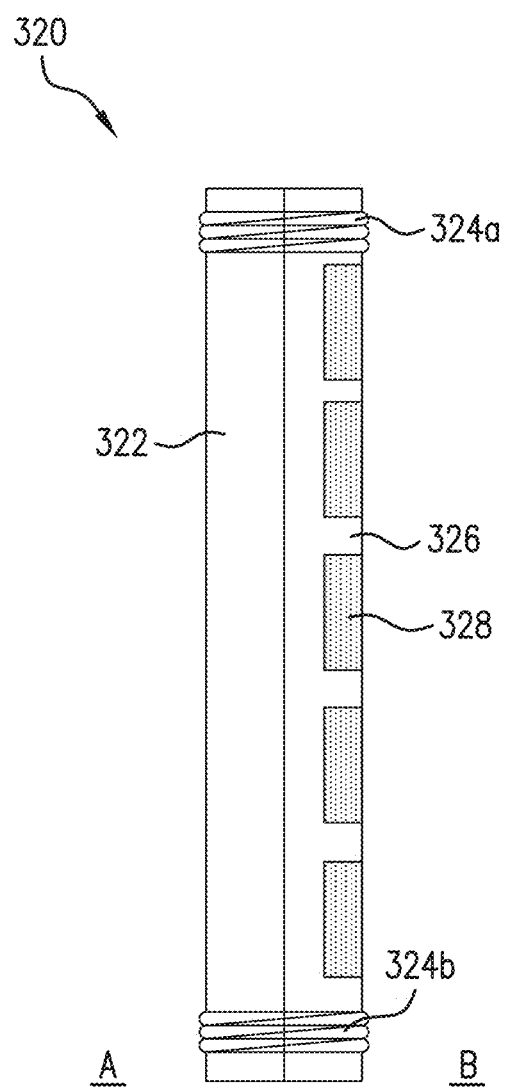

FIG. 3C shows a cross-section of exemplary fabric 320 with two layers affixed around the edges at locations 324a and 324b, but free to move (i.e. separate) everywhere else. The first layer 322 comprises a hydrophobic material, making the outer A surface of the fabric hydrophobic. The second layer includes both hydrophobic regions 326 and hydrophilic regions 328 on the inner B surface. Both regions 326 and 328 penetrate the second layer only partially, e.g., about halfway. The regions 326 connect to the outer surface of the second layer to form a larger hydrophobic region. The outer surface of the second layer is hydrophobic (optionally, entirely hydrophobic), and this outer surface is in contact with the inner surface of the first layer.

Figure 3D:
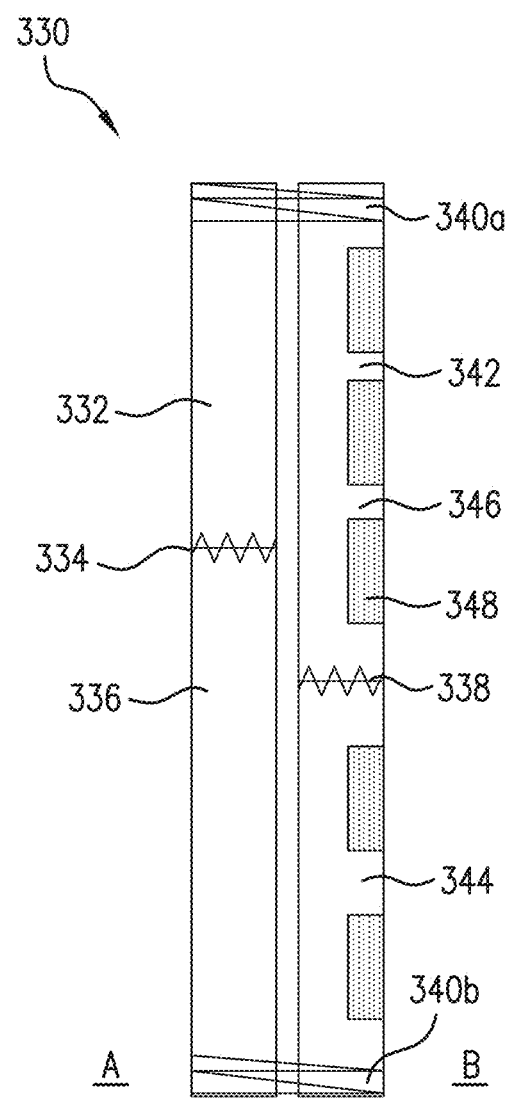

FIG. 3D shows a cross-section of exemplary fabric 330 with two layers where each layer is composed of more than one piece of fabric. The two layers are affixed around the edges at locations 340a and 340b such that the seam 334 (where the hydrophobic first piece of the layer 332 is joined to the hydrophobic second piece of the layer 336) is not aligned to the seam 338 (where the first piece of the layer 342 is joined to the second piece of the layer 344). The two pieces 342 and 344 of the second layer have both hydrophobic regions 346 and hydrophilic regions 348 on the inner B surface. Both regions 346 and 348 penetrate the second layer only partially, e.g., about halfway. In some embodiments, the regions 346 connect to the outer A surface of the second layer (e.g., 332 and 336) to form a larger hydrophobic region. The outer surface of the second layer is hydrophobic (optionally, entirely hydrophobic), and this outer surface is in contact with the inner surface of the first layer.

In some embodiments, the fabric further comprises an intermediate layer between the outer surface and the inner surface. In other embodiments, the intermediate layer is affixed to one or both of the outer surface and the inner surface. In further embodiments, the intermediate layer comprises a hydrophobic material of the present disclosure. In some embodiments, the intermediate layer comprises a hydrophilic material of the present disclosure. In these embodiments, the intermediate layer can also be used to achieve desired feel and/or loft of the fabric.

Figure 4A:
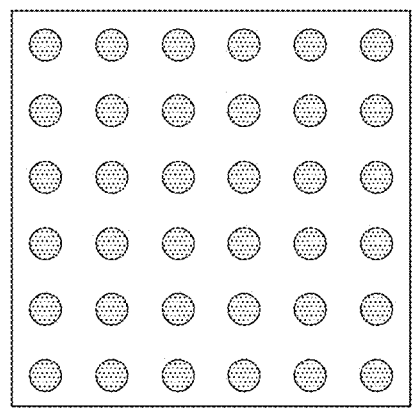
FIGS. 4A-4F show patterns on the inside of a fabric with improved moisture control, in accordance with some embodiments.

In some embodiments, one or more second hydrophilic regions of the present disclosure (e.g., a hydrophilic portion of an inner surface of the present disclosure) form a plurality of repeated shapes. In some embodiments, one or more second hydrophilic regions of the present disclosure (e.g., a hydrophilic portion of an inner surface of the present disclosure) are surrounded by the one or more first hydrophobic regions (e.g., hydrophobic portions of an inner surface of the present disclosure). An exemplary configuration using this concept is illustrated in FIG. 4A. FIG. 4A shows a pattern in which hydrophilic regions (e.g., hydrophilic portions of an inner surface of the present disclosure) form a pattern of repeated circles. In some embodiments, each circle is surrounded by the hydrophobic region.

Figure 4B:
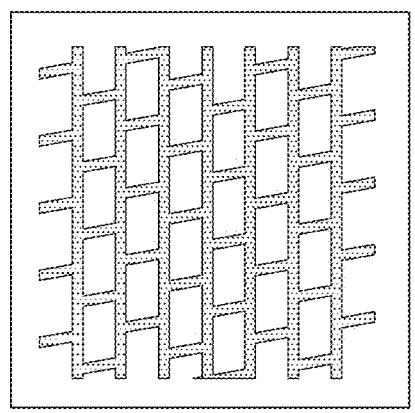
Figure 4C:
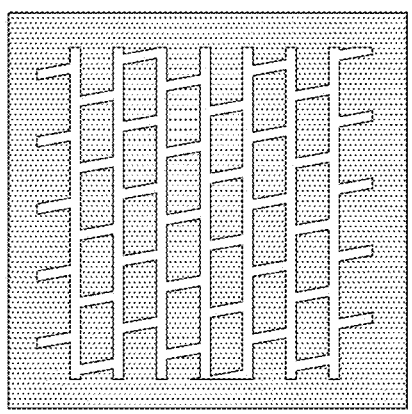
Figure 4D:
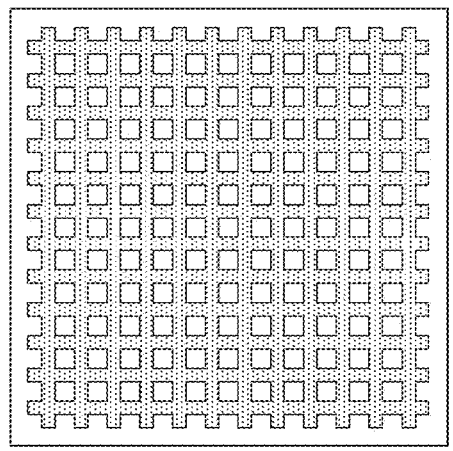

In some embodiments, the one or more hydrophilic second regions (e.g., hydrophilic portions of an inner surface of the present disclosure) form a lattice. As used herein, a "lattice" refers to any interconnected combination of shapes wherein the shapes and the connections comprise the same material (e.g., a hydrophilic material of the present disclosure). Exemplary configurations using this concept are illustrated in FIGS. 4B & 4D. FIG. 4B shows a pattern in which the hydrophilic regions form a lattice with angled connections, wherein the spaces within the lattice are parallelograms, and in which the spaces within the lattice are filled by the hydrophobic regions. The lattice is also surrounded by a further hydrophobic region. FIG. 4D shows a pattern in which the hydrophilic regions form a lattice with perpendicular connections, wherein the spaces within the lattice are squares, and in which the spaces within the lattice are filled by the hydrophobic regions. The lattice is also surrounded by a further hydrophobic region. These exemplary lattice patterns are one way in which hydrophilic second regions can be patterned to form a fluidic flow network, which moves liquid away from source points, creates a greater surface area of evaporation per same amount of perspiration, and thus reduces dry time.

In other embodiments, the one or more first hydrophobic regions (e.g., hydrophobic portions of an inner surface of the present disclosure) form a plurality of repeated shapes. In some embodiments, the one or more first hydrophobic regions (e.g., hydrophobic portions of an inner surface of the present disclosure) are surrounded by the one or more second hydrophilic regions (e.g., a hydrophilic portion of an inner surface of the present disclosure).

In some embodiments, the one or more hydrophobic first regions (e.g., hydrophobic portions of an inner surface of the present disclosure) form a lattice. An exemplary pattern using this concept is illustrated in FIG. 4C. FIG. 4C shows a pattern in which the hydrophobic regions form a lattice with angled connections, wherein the spaces within the lattice are parallelograms, and in which the spaces within the lattice are filled by the hydrophilic regions. The lattice is also surrounded by a further hydrophilic region. In some embodiments, the one or more first hydrophobic regions of the inner surface of the fabric are patterned in a geometric pattern or logo. A variety of patterns can suitably be used to pattern the materials described above, including, without limitation, patterns with multiple shapes, widths, angles, connective channels with uniform or non-uniform thicknesses, and/or multiple widths, radii, angles, or curvatures. For example, in some embodiments, a material of the present disclosure has hydrophilic connective channels with uniform or non-uniform thicknesses, and/or multiple widths, radii, angles, or curvatures.

Figure 4E:
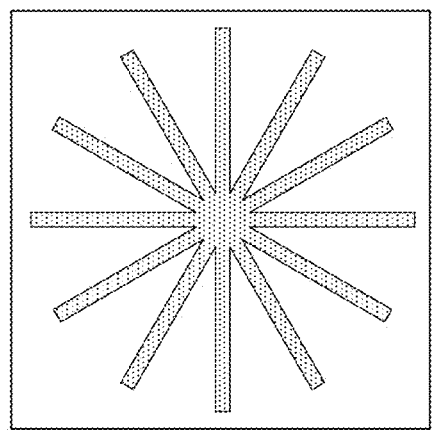
Figure 4F:
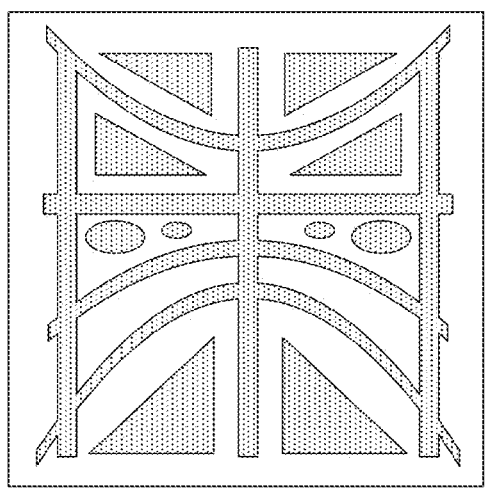

In some embodiments, the one or more second hydrophilic regions of the inner surface of the fabric are patterned in a geometric pattern, logo, text, or other design. Exemplary configurations using this concept are illustrated by FIGS. 4E & 4F. FIG. 4E shows a radially symmetric pattern of hydrophilic channels that are connected at the center, and surrounded by the hydrophobic region. Without wishing to be bound by theory, it is thought that this type of pattern can facilitate moisture movement away from an area of dense perspiration to dryer areas. FIG. 4F shows a laterally symmetric pattern of hydrophilic regions using both connected channels and discrete shapes. The spaces between the hydrophilic regions are filled by the hydrophobic regions, and the pattern is surrounded by a further hydrophobic region.

A variety of hydrophobic materials can suitably be used as described above, e.g., in any of the materials described as "hydrophobic" herein, such as the outer surface or one or more regions of the inner surface of a fabric of the present disclosure. In some embodiments, a hydrophobic material of the present disclosure comprises polypropylene, polydimethylsiloxane (PDMS), fluoro-polymer (including without limitation a polymer made from tetrafluoroethylene-, vinyl fluoride-, perfluoroether-, vinylidene fluoride-, or chlorotrifluoroethylene-based monomers, such as polytetrafluoroethylene or PTFE), olefin, or a blend thereof. In some embodiments, hydrophobicity of the hydrophobic material can be achieved through a hydrophobic and/or liquid-repellent coating (e.g., a fluoropolymer, silicone, hydrosilicone, fluoroacrylate, or wax) or using inherent hydrophobic fibers, including polypropylene, PDMS, PTFE, etc. For example, a hydrophobic material of the present disclosure can comprise a porous material of the present disclosure with a hydrophobic coating (e.g., on an outer surface and/or hydrophobic portion of an inner surface). Such porous materials can include, without limitation, a mesh, a foam, a polymer, or a textile of the present disclosure. In some embodiments, the textile includes without limitation a natural fiber, a synthetic fiber, or a blend thereof. For example, in some embodiments, a textile of the present disclosure can include without limitation cotton, hemp, linen, rayon, coconut fiber, cellulose, wool, silk, bamboo, polyurethane, polypropylene, polyethylene, glass, acetate, polyester, nylon, lyocell, modal, poly-paraphenylene, terephthalamide, elastin fiber, and/or any blend thereof.

A variety of hydrophilic materials can suitably be used as described above, e.g., in any of the materials described as "hydrophilic" herein, such as one or more regions of the inner surface of a fabric of the present disclosure. In some embodiments, a hydrophilic material of the present disclosure is a textile. In some embodiments, the textile includes without limitation a natural fiber, a synthetic fiber, or a blend thereof. For example, in some embodiments, a textile of the present disclosure can include without limitation cotton, rayon, coconut fiber, cellulose, silk, bamboo, and/or any blend thereof. In some embodiments, hydrophilicity of the hydrophilic material can be achieved through a hydrophilic and/or liquid-absorbent coating (e.g., hydrophilic silicone). For example, a hydrophilic material of the present disclosure can comprise a porous material of the present disclosure with a hydrophilic coating on at least one region of the inner surface, e.g., as described above. Such porous materials can include, without limitation, a textile of the present disclosure. In some embodiments, the textile includes without limitation a natural fiber, a synthetic fiber, or a blend thereof. For example, in some embodiments, a textile of the present disclosure can include without limitation cotton, hemp, linen, rayon, coconut fiber, cellulose, wool, silk, bamboo, polyurethane, polypropylene, polyethylene, glass, acetate, polyester, nylon, lyocell, modal, poly-paraphenylene, terephthalamide, elastin fiber, and/or any blend thereof.

In some embodiments, and as described in greater detail in section II below, a hydrophobic material of the present disclosure includes a hydrophobic yarn. Materials that can be used for hydrophobic yarns include without limitation inherently hydrophobic fibers (e.g., contact angle of material is higher than 90 degrees), including polypropylene, polydimethylsiloxane and fluoropolymer. Suitable materials can also include yarns or textiles modified by water/oil repellent coatings (e.g. fluoropolymer, silicone, wax), including treated natural and synthetic yarns, and blends. In some embodiments, the textile is selected from the group consisting of cotton, hemp, rayon, coconut fiber, cellulose, wool, silk, bamboo, polyurethane, polypropylene, polyethylene, glass, acetate, polyester, nylon, elastin fiber, and any blend thereof.

In some embodiments, and as described in greater detail in section II below, a hydrophilic material of the present disclosure includes a hydrophilic yarn. Materials that can be used for hydrophilic yarns include without limitation inherently hydrophilic fibers, including cotton, cellulose, rayon, coconut fiber, silk, bamboo. Suitable materials can also include hydrophilic treated natural and synthetic yarns, including natural and synthetic yarns and blends. In some embodiments, the textile is selected from the group consisting of wool, silk, bamboo, polyurethane, polypropylene, polyethylene, glass, acetate, polyester, elastin fiber, and any blend thereof.

As described above, in some embodiments, a fabric of the present disclosure can comprise an outer hydrophobic surface, and an inner surface with one or more first hydrophobic regions and one or more second hydrophilic regions. In some embodiments, a hydrophilic material of the one or more second regions will not resist a hydrostatic pressure (equal to 0 pa). In some embodiments, a hydrophobic material of the present disclosure is able to resist a hydrostatic pressure of greater than 0 pa.

In some embodiments, hydrophobicity can refer to the hydrostatic pressure able to be resisted by the material. In some embodiments, a hydrophobic material of the present disclosure (e.g., on an outer surface and/or hydrophobic portion of an inner surface) resists a hydrostatic pressure of greater than or equal to about 150 pa, greater than or equal to about 200 pa, greater than or equal to about 250 pa, greater than or equal to about 300 pa, greater than or equal to about 350 pa, greater than or equal to about 400 pa, greater than or equal to about 450 pa, greater than or equal to about 500 pa, greater than or equal to about 600 pa, greater than or equal to about 700 pa, greater than or equal to about 800 pa, greater than or equal to about 900 pa, greater than or equal to about 1 kpa, greater than or equal to about 1.5 kpa, greater than or equal to about 2 kpa, greater than or equal to about 2.5 kpa, or greater than or equal to about 3 kpa. In some embodiments, a hydrophobic material of the present disclosure (e.g., on an outer surface and/or hydrophobic portion of an inner surface) resists a hydrostatic pressure of less than or equal to about 3 kpa, less than or equal to about 2.5 kpa, less than or equal to about 2 kpa, less than or equal to about 1.5 kpa, less than or equal to about 1 kpa, less than or equal to about 900 pa, less than or equal to about 800 pa, less than or equal to about 700 pa, less than or equal to about 600 pa, less than or equal to about 500 pa, less than or equal to about 450 pa, less than or equal to about 400 pa, less than or equal to about 350 pa, less than or equal to about 300 pa, less than or equal to about 250 pa, less than or equal to about 200 pa, or less than or equal to about 150 pa. For example, in some embodiments, a hydrophobic material of the present disclosure (e.g., on an outer surface and/or hydrophobic portion of an inner surface) resists a hydrostatic pressure less than about any of the following hydrostatic pressures (in pa): 3000, 2500, 2000, 1500, 1000, 900, 800, 700, 600, 500, 400, 300, 250, 200, or 150. In some embodiments, a hydrophobic material of the present disclosure (e.g., on an outer surface and/or hydrophobic portion of an inner surface) resists a hydrostatic pressure greater than about any of the following hydrostatic pressures (in pa): 125, 150, 200, 250, 300, 400, 500, 600, 700, 800, 900, 1000, 1500, 2000, or 2500. That is, the hydrophobic material of the present disclosure (e.g., on an outer surface and/or hydrophobic portion of an inner surface) can resist a hydrostatic pressure of any of a range of hydrostatic pressures having an upper limit of 3000, 2500, 2000, 1500, 1000, 900, 800, 700, 600, 500, 400, 300, 250, 200, or 150 pa and an independently selected lower limit of 125, 150, 200, 250, 300, 400, 500, 600, 700, 800, 900, 1000, 1500, 2000, or 2500 pa, wherein the lower limit is less than the upper limit. For example, in some embodiments, a hydrophobic material of the present disclosure (e.g., on an outer surface and/or hydrophobic portion of an inner surface) resists a hydrostatic pressure of between about 500 pa and about 3000 pa. Techniques for measuring hydrostatic pressure resistance are known in the art. For example, a standard technique is the use of a hydrostatic head tester. The device applies an increasing value of water pressure on a fabric sample, and the maximum hydrostatic pressure is recorded when water penetrates through the sample and leakage happens.

In some embodiments, the hydrophilic material of a second region of the present disclosure (e.g., a hydrophilic portion of an inner surface of the present disclosure, such as regions 204, 306, 316, 328, and/or 348 as described supra) comprises 5% to 95% of the total thickness of the fabric. In some embodiments, a hydrophilic material of the present disclosure comprises a percentage of the total thickness of the fabric greater than or equal to about 5%, greater than or equal to about 10%, greater than or equal to about 15%, greater than or equal to about 20%, greater than or equal to about 25%, greater than or equal to about 30%, greater than or equal to about 35%, greater than or equal to about 40%, greater than or equal to about 45%, greater than or equal to about 50%, greater than or equal to about 55%, greater than or equal to about 60%, greater than or equal to about 65%, greater than or equal to about 70%, greater than or equal to about 75%, greater than or equal to about 80%, greater than or equal to about 85%, greater than or equal to about 90%, or greater than or equal to about 95%. In some embodiments, a hydrophilic material of the present disclosure comprises a percentage of the total thickness of the fabric less than or equal to about 95%, less than or equal to about 90%, less than or equal to about 85%, less than or equal to about 80%, less than or equal to about 75%, less than or equal to about 70%, less than or equal to about 65%, less than or equal to about 60%, less than or equal to about 55%, less than or equal to about 50%, less than or equal to about 45%, less than or equal to about 40%, less than or equal to about 35%, less than or equal to about 30%, less than or equal to about 25%, less than or equal to about 20%, less than or equal to about 15%, less than or equal to about 10%, or less than or equal to about 5%. For example, in some embodiments, a hydrophilic material of the present disclosure comprises a percentage of the total thickness of the fabric less than about any of the following percentages: 95%, 85%, 75%, 65%, 55%, 45%, 35%, 25%, 15%, or 10%. In some embodiments, a hydrophilic material of the present disclosure comprises a percentage of the total thickness of the fabric less than about any of the following percentages: 5%, 10%, 15%, 25%, 35%, 45%, 55%, 65%, 75%, 85%, or 90%. That is, the hydrophilic material of the present disclosure comprises the total thickness of the fabric of any of a range of percentages having an upper limit of 95%, 85%, 75%, 65%, 55%, 45%, 35%, 25%, 15%, or 10% and an independently selected lower limit of 5%, 10%, 15%, 25%, 35%, 45%, 55%, 65%, 75%, 85%, or 90%, wherein the lower limit is less than the upper limit.

In some embodiments, the hydrophobic material of the outer surface is the same as the hydrophobic material of the one or more first regions of the inner surface. In some embodiments, the hydrophobic material of the outer surface is different from the hydrophobic material of the one or more first regions of the inner surface.

In some embodiments, the collective area of the hydrophilic second region(s) of the inner surface comprises less than about 85%, less than about 75%, less than about 65%, less than about 55%, less than about 45%, less than about 35%, less than about 25%, or less than about 15% of the surface area of the inner surface. In some embodiments, the collective area of the hydrophilic second region(s) of the inner surface comprises greater than about 15%, greater than about 25%, greater than about 35%, greater than about 45%, greater than about 55%, greater than about 65%, greater than about 75%, or greater than about 85% of the surface area of the inner surface. For example, in some embodiments, the collective area of the hydrophilic second region(s) of the inner surface comprises less than: 85%, 75%, 65%, 55%, 45%, 35%, 25%, or 20% of the surface area of the inner surface. In some embodiments, the collective area of the hydrophilic second region(s) of the inner surface comprises greater than: 15%, 25%, 35%, 45%, 55%, 65%, 75%, or 80% of the surface area of the inner surface. That is, the collective area of the hydrophilic second region(s) of the inner surface comprises any of a range of percentages having an upper limit of 85%, 75%, 65%, 55%, 45%, 35%, 25%, or 20% and an independently selected lower limit of 15%, 25%, 35%, 45%, 55%, 65%, 75%, or 80%, wherein the lower limit is less than the upper limit. For example, in some embodiments, the collective area of the hydrophilic second region(s) of the inner surface comprises a percentage between about 15% and about 85% of the surface area of the inner surface.

In some embodiments, the collective area of the hydrophobic first region(s) of the inner surface comprises less than about 85%, less than about 75%, less than about 65%, less than about 55%, less than about 45%, less than about 35%, less than about 25%, or less than about 15% of the surface area of the inner surface. In some embodiments, the collective area of the hydrophobic first region(s) of the inner surface comprises greater than about 15%, greater than about 25%, greater than about 35%, greater than about 45%, greater than about 55%, greater than about 65%, greater than about 75%, or greater than about 85% of the surface area of the inner surface. For example, in some embodiments, the collective area of the hydrophobic first region(s) of the inner surface comprises less than: 85%, 75%, 65%, 55%, 45%, 35%, 25%, or 20% of the surface area of the inner surface. In some embodiments, the collective area of the hydrophobic first region(s) of the inner surface comprises greater than: 15%, 25%, 35%, 45%, 55%, 65%, 75%, or 80% of the surface area of the inner surface. That is, the collective area of the hydrophobic first region(s) of the inner surface comprises any of a range of percentages having an upper limit of 85%, 75%, 65%, 55%, 45%, 35%, 25%, or 20% and an independently selected lower limit of 15%, 25%, 35%, 45%, 55%, 65%, 75%, or 80%, wherein the lower limit is less than the upper limit. For example, in some embodiments, the collective area of the hydrophobic first region(s) of the inner surface comprises a percentage between about 15% and about 85% of the surface area of the inner surface.

In some embodiments, the collective surface area of the hydrophilic regions and the collective surface of the hydrophobic regions of the inner surface of a fabric of the present disclosure are substantially equivalent, i.e. each region comprises about 50% of the surface area of the inner surface of the fabric. Exemplary patterns using this concept are illustrated in the patterns shown in FIGS. 10A-10F, each of which contains substantially similar hydrophobic and hydrophilic surface areas despite their multiple different patterns.

In some embodiments, the proportion of the collective area of the one or more hydrophilic regions (e.g., the one or more second regions of the inner surface) to the surface area of the inner and outer surfaces of the fabric (i.e. the total surface area of the fabric) comprises a percentage between about 40% and about 95% of the surface area of the inner surface. In some embodiments, the proportion of the collective area of the one or more hydrophilic regions to the total surface area of the fabric is less than about 95%, less than about 90%, less than about 85%, less than about 80%, less than about 75%, less than about 70%, less than about 65%, less than about 60%, less than about 55%, less than about 50%, less than about 45%, or less than about 40%. In some embodiments, the proportion of the collective area of the one or more hydrophilic regions to the total surface area of the fabric is greater than about 40%, greater than about 45%, greater than about 55%, greater than about 65%, greater than about 75%, greater than about 85%, or greater than about 95%. For example, in some embodiments, the proportion of the collective area of the one or more hydrophilic regions to the total surface area of the fabric comprises less than: 95%, 85%, 75%, 65%, 55%, or 45%. In some embodiments, the proportion of the collective area of the one or more hydrophilic regions to the total surface area of the fabric comprises greater than: 40%, 45%, 55%, 65%, 75%, 85%, or 90%. That is, the proportion of the collective area of the one or more hydrophilic regions to the total surface area of the fabric comprises any of a range of percentages having an upper limit of 95%, 85%, 75%, 65%, 55%, or 45% and an independently selected lower limit of 40%, 45%, 55%, 65%, 75%, 85%, or 90%, wherein the lower limit is less than the upper limit. In some embodiments, the surface area of each of the hydrophilic regions is added together to provide a total of the collective area, and this total is then divided by the surface area of the inner surface of the fabric to provide a percentage of the collective area of the one or more hydrophilic regions (e.g., the one or more second regions of the inner surface).

The fabrics described herein can find use in a variety of applications, either as the entire material for an item, or as a subset thereof. In some embodiments, a fabric of the present disclosure can be a component of bedding, footwear, seat covers, outdoor gear, upholstery, or an accessory. Further provided herein are garments comprising any of the fabrics of the present disclosure. In some embodiments, the fabric described herein is used in a garment, and the inner surface of the fabric faces the skin of the wearer of the garment. In some embodiments, the entire inner surface of the garment is patterned with hydrophilic patterns for partial absorption, and the entire outer surface of the garment is hydrophobic, thereby preventing the appearance of perspiration on the outside of the garment. In some embodiments, the garment includes at least a portion of the following items, without limitation: a coat, a dress, a skirt, a sports bra, an undergarment, a pant, a short, or a sock. In some embodiments, the garment is a shirt. In some embodiments, the fabric is used in the shirt at one or more of an underarm area, a mid-back area, a lower-back area, a front chest area, a stomach area, and a shoulder area.

In some embodiments, a fabric described herein is used for localized treatment of a shirt in the mid-back area and/or the lower-back area. In some embodiments, the treatment is localized to areas of higher sweat production.

Figure 5B:
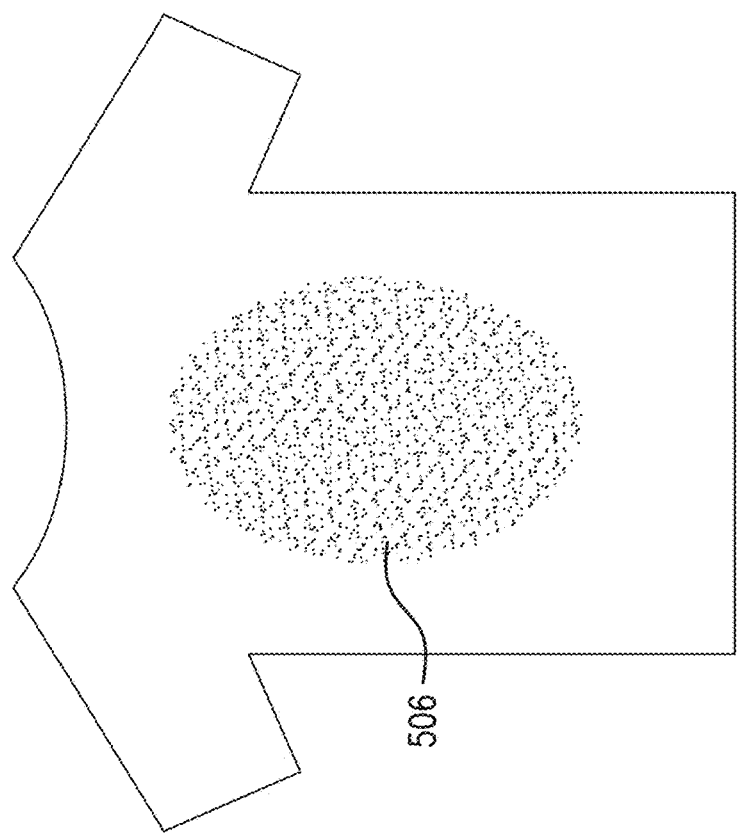
FIG. 5B shows the back of the garment.
Figure 5A:
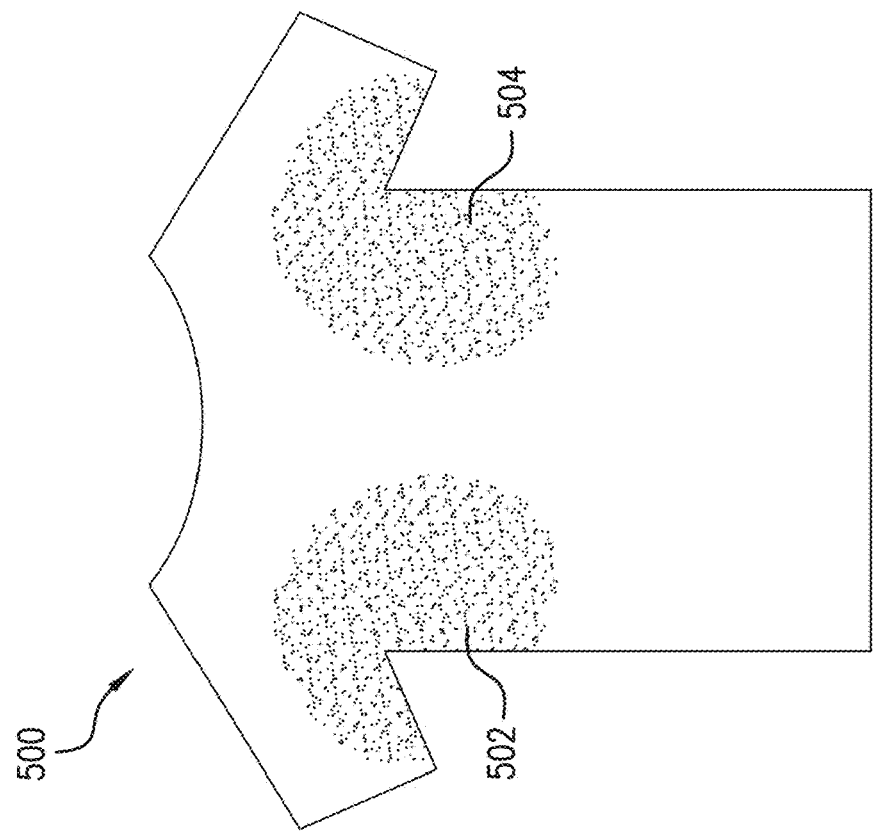
FIG. 5A shows the front of a garment with improved moisture control, in accordance with some embodiments.

Exemplary treatments of a shirt 500 are illustrated in FIGS. 5A & 5B. FIG. 5A illustrates the front view of a shirt 500 with a fabric of the present disclosure (e.g., as illustrated in FIGS. 1A-4F or otherwise described herein) in the left front region 502 and in the right front region 504. FIG. 5B illustrates the back view of a shirt with a fabric of the present disclosure (e.g., as illustrated in FIGS. 1-4F or otherwise described herein) in the mid-back region 506. Advantageously, these treatments provide moisture control in areas of high accumulation of perspiration.

In some embodiments, a fabric described herein is used for localized treatment of a shirt such that the fabric is surrounded by a hydrophobic boundary or barrier to prevent liquid from spreading beyond the treated area. In some embodiments, the fabric used in the garment is patterned so the one or more hydrophobic first regions form an interconnected lattice.

Figure 6A:
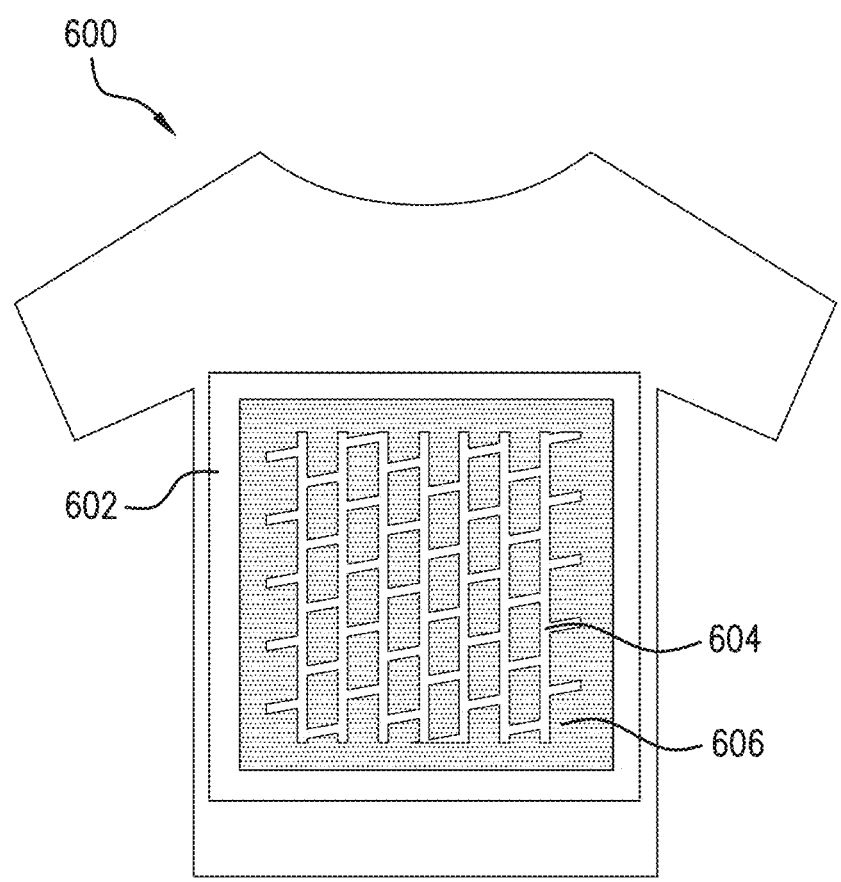
FIG. 6A shows a garment with a hydrophobic barrier surrounding a pattern, in accordance with some embodiments.

One exemplary treatment of a shirt 600 in accordance with this embodiment is illustrated in FIG. 6A. The shirt 600 is locally treated with a fabric that is surrounded (e.g., entirely) by the hydrophobic boundary 602. The fabric is patterned with a hydrophobic lattice 604 that contains hydrophilic regions 606, and is also entirely surrounded by hydrophilic region 606. In this example, moisture that accumulates in hydrophilic regions 606 is contained by hydrophobic boundary 602. In some embodiments, the fabric used in the garment is patterned so the one or more hydrophilic second regions form an interconnected lattice.

Figure 6B:
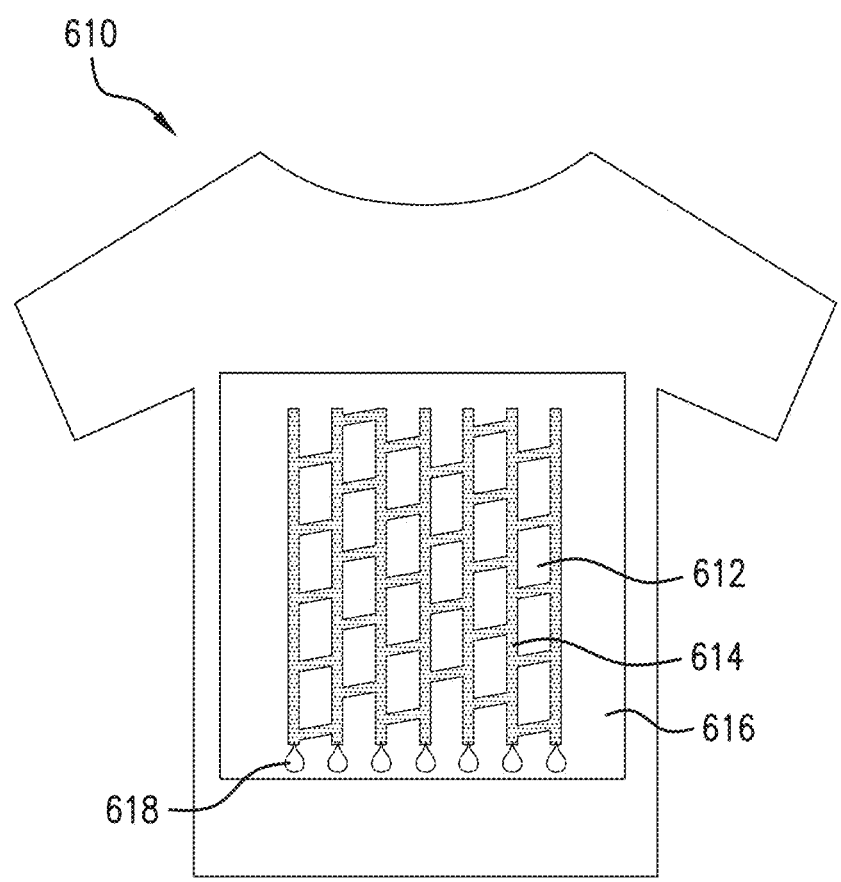
FIG. 6B shows droplet formation at the hydrophobic barrier.

The hydrophobic boundary can facilitate different types of moisture spreading control. In a low moisture setting, moisture can remain absorbed inside the hydrophobic boundary until it evaporates, whereas in a high moisture setting, moisture can accumulate at the hydrophobic barrier and eventually drip off of the material. This process is illustrated in FIG. 6B. The shirt 610 is treated with a fabric that is patterned with a hydrophilic lattice 614. The hydrophilic lattice contains hydrophobic regions 612, and is also surrounded by a hydrophobic boundary 616. When a sufficient amount of moisture is absorbed by hydrophilic lattice 614, the moisture will accumulate at hydrophobic boundary 616, and form moisture droplets 618 that will drip off of the material. For example, in a high perspiration setting, perspiration accumulates at the hydrophobic boundary and then drips off the material.

II. Methods of Making Articles with Improved Moisture Management

Certain aspects of the present disclosure relate to methods of making an article or fabric having improved moisture management. Exemplary methods of making these articles are set forth below, but the skilled artisan will appreciate that various fabrication methods and materials known in the art can be used to manufacture the articles of the present disclosure, depending upon the specific configuration of the article, without departing from the scope of the present disclosure. Any of the materials, patterns, and affixtures described supra can find use in the methods of the present disclosure.

In some embodiments, a method of making a fabric includes: (a) providing a hydrophilic material comprising an outer and an inner surface, the inner surface comprising one or more first regions and one or more second regions; (b) screen printing a first hydrophobic material onto one or more first regions of the inner surface of the hydrophilic material;

and (c) screen printing a second hydrophobic material onto the outer surface of the hydrophilic material to cover the outer surface. Thus, the fabric includes an outer surface comprising a hydrophobic material and an inner surface comprising one or more first regions comprising the first hydrophobic materials and one or more second regions comprising the hydrophilic material, wherein the one or more first regions and the one or more second regions are different. In some embodiments, the one or more hydrophobic first regions of the inner surface are in contact with at least a portion of the hydrophobic material of the outer surface. Any of the patterns, outer surfaces, inner surfaces and regions thereof, and materials described supra can be used.

Figures 7A, 7B:
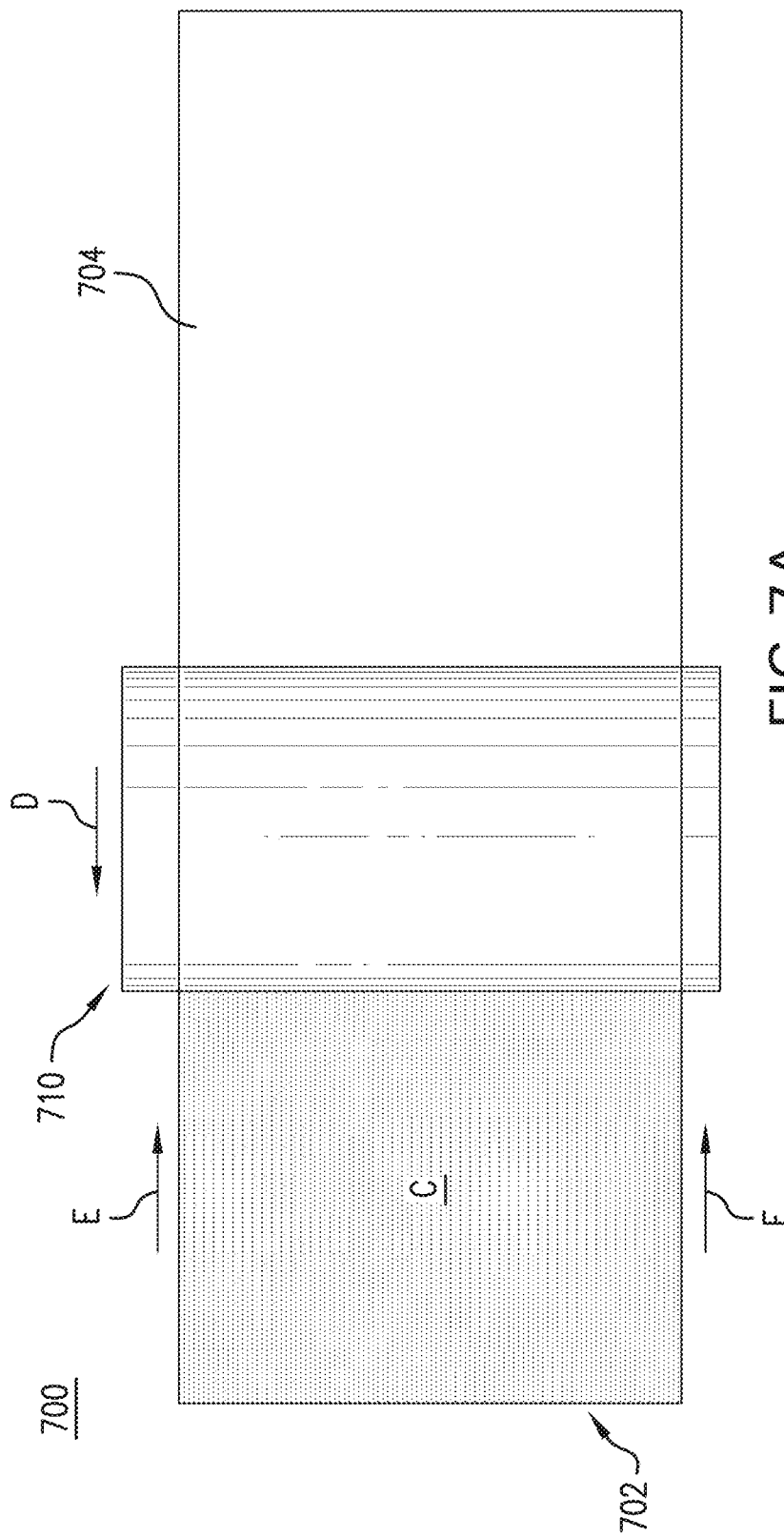

Exemplary process 700 for making a fabric of the present disclosure is illustrated in FIGS. 7A-7D. As shown in FIG. 7A, process 700 starts with hydrophilic material 702. Material 702 can be any of the exemplary hydrophilic materials described herein or otherwise known in the art. To begin process 700, material 702 is laid flat such that one surface (designated as "C" in FIG. 7A) moves in direction E and is facing the roller 710 which has the rolling direction D. Screen roller 710 is then used to put down enough hydrophobic material to penetrate material 702. The hydrophobic material can be any of the exemplary materials described herein. In this example, the mesh size of the screen, viscosity of ink, and/or pressure is used such that the hydrophobic material penetrates halfway through the thickness of the hydrophilic material 702, as shown in FIG. 7B. In some embodiments, one or more these factors can be varied to increase or decrease penetration. For example, in some embodiments, lower mesh size, lower ink viscosity, and/or higher pressure can result in greater penetration of the material into the fabric. In this example, roller 710 does not have a pattern, so it completely covers the material surface with a controlled layer of hydrophobic material 704. A close-up, cross-sectional view of process 700 is provided in FIG. 7B.

Exemplary process 720 for making a fabric of the present disclosure is illustrated in FIGS. 7C & 7D. As shown in FIG. 7C, in some embodiments, process 720 is conducted using the material 702 after process 700 is completed (e.g., a drying step follows process 700, and then the material 702 is turned over so that the opposite surface faces the roller, here designated as "F"). In process 720, a screen roller 730 is used to apply a hydrophobic material to the back surface "F" in such a way that a pattern is formed. In this example, the pattern is a hydrophilic lattice comprising the hydrophilic material, wherein the spaces of the lattice are filled with regions 722 of the applied hydrophobic material. In some embodiments, the hydrophobic material of process 720 is the same as that of process 700. In other embodiments, the hydrophobic material of process 720 is a different hydrophobic material. FIG. 7D shows a cross-sectional view of process 720. In this example, a mesh size of screen, viscosity of ink, and/or pressure is used such that the hydrophobic material penetrates over halfway through the thickness of the hydrophilic material 702 such that regions 722 (deposited by roller 730 in process 720) overlap with region 704 (deposited by roller 710 in process 700). In this example, the overlap of regions 722 and 704 ensures that hydrophilic regions remain isolated on the inner surface. Without wishing to be bound by theory, it is thought that this isolation can prevent absorbed liquid from moving parallel to the material surfaces. In some embodiments, one or more of these factors can be varied to increase or decrease penetration. Thus, after processes 700 and 720, a material is generated having an outer hydrophobic surface (e.g., 704), and an inner surface with one or more hydrophilic regions remaining from the original hydrophilic material 702 and one or more applied hydrophobic regions (e.g., 722). In some embodiments, region 704 comprises about 50% of the total thickness of the finished material, and region 722 comprises about 70% of the total thickness of the finished material.

In some embodiments, a method of making a fabric includes: (a) providing a hydrophilic material comprising an outer and an inner surface, the outer surface comprising one or more first regions and one or more second regions; (b) screen printing a first hydrophobic material onto one or more first regions of the outer surface of the hydrophilic material such that the first hydrophobic material penetrates through the hydrophilic material to generate an inner surface comprising one or more first regions comprising the first hydrophobic material and one or more second regions comprising the hydrophilic material; and (c) screen printing a second hydrophobic material onto the outer surface of the hydrophilic material such that the second hydrophobic material penetrates through the hydrophilic material to generate an outer surface comprising the second hydrophobic material. Thus, the fabric includes an outer surface comprising a hydrophobic material and an inner surface comprising one or more first regions comprising the first hydrophobic materials and one or more second regions comprising the hydrophilic material, wherein the one or more first regions and the one or more second regions are different. In some embodiments, the one or more hydrophobic first regions of the inner surface are in contact with at least a portion of the hydrophobic material of the outer surface. In some embodiments, the first and the second hydrophobic materials are the same. In other embodiments, the first and the second hydrophobic materials are different. Any of the patterns, outer surfaces, inner surfaces and regions thereof, and materials described supra can be used.

Exemplary process 740 for making a fabric of the present disclosure is illustrated in FIGS. 7E & 7F. As shown in FIG. 7E, process 740 starts with hydrophilic material 742. Material 742 can be any of the exemplary hydrophilic materials described herein or otherwise known in the art. To begin process 740, material 742 is laid flat such that one surface (designated as "G" in FIG. 7E) is facing the roller and moves in direction E. Screen roller 750 (in the roller direction D) is used to apply a hydrophobic material to the front "G" surface of fabric 742 in such a way that a pattern is formed. In this example, the pattern is a hydrophilic lattice comprising the hydrophilic material, wherein the spaces of the lattice are filled with regions 744 of the applied hydrophobic material. In this example, a mesh size of screen, viscosity of ink, and/or pressure is used such that the hydrophobic material penetrates entirely through the thickness of the hydrophilic material 742. To continue process 740, screen roller 760 (in the roller direction D) is then used to apply a hydrophobic material to the front "G" surface of fabric 742. In this example, roller 760 is patterned such that the pattern fills in the hydrophilic lattice left by roller 750. Unlike for roller 750, however, for roller 760, a mesh size of screen, viscosity of ink, and/or pressure is used such that the hydrophobic material penetrates halfway through the thickness of the hydrophilic material 742. This creates a surface that includes region 746 comprising the hydrophobic material deposited through roller 760. The hydrophobic material can be any of the exemplary materials described herein. In some embodiments, the hydrophobic material deposited by roller 750 is the same as the hydrophobic material deposited by roller 760. In other embodiments, the hydrophobic material deposited by roller 760 is a different material. A close-up, cross-sectional view of process 740 is provided in FIG. 7F. Thus, after process 740, a material is generated having an outer hydrophobic surface (e.g., 746), and an inner surface with one or more hydrophilic regions remaining from the original hydrophilic material 742 and one or more applied hydrophobic regions (e.g., 744).

Some printing methods use various thickeners to keep the ink from migrating and to maintain a clear or well-defined print. In printing in general, there are a number of variables which can be controlled by one of ordinary skill in the art. Some variables such as print paste viscosity, amount of print paste applied, roller/wiper pressure, speeds, mesh size of the screen, etc., can be used to control the depth of penetration of the print paste. One way to control depth of ink penetration is to adjust the printing parameters so that the print paste can penetrate through the fabric without merging together.

In some embodiments, the outer surface comprises about 50% of the total thickness of the fabric, and the inner surface comprises about 50% of the total thickness of the fabric. In some embodiments, the ratio of the thickness of the outer surface to the thickness of the inner surface is between about 0.1 to about 10. Any of the patterns, outer surfaces, inner surfaces and regions thereof, and materials described supra can be used.

There are currently several many methods of textile printing available, including without limitation flatbed printing, rotary printing, inkjet printing, and so forth. Any hydrophilic material of the present disclosure, including but not limited to cotton, treated polyester, nylon, silk, bamboo fibers in woven, knitted or non-woven structure, can be used as the material substrate or hydrophilic material (e.g., 702, 742). Any of the hydrophobic coatings described herein, such as fluorochemicals, silicones, waxes or other similar materials, can be used to create hydrophobic regions (e.g., 704, 722, 744, 746).

In some embodiments, a method of making a fabric of the present disclosure includes: (a) providing a hydrophobic material comprising an outer and an inner surface, the inner surface comprising one or more first regions and one or more second regions; and (b) screen printing a hydrophilic material onto one or more first regions of the inner surface. Thus, the fabric includes an outer surface comprising the hydrophobic material and an inner surface comprising one or more first regions comprising the hydrophobic material and one or more second regions comprising the printed hydrophilic material, wherein the one or more first regions and the one or more second regions are different. In some embodiments, the outer surface comprises about 50% of the total thickness of the fabric, and the inner surface comprises about 50% of the total thickness of the fabric. In some embodiments, the ratio of the thickness of the outer surface to the thickness of the inner surface is between about 0.1 to about 10. Any of the patterns, outer surfaces, inner surfaces and regions thereof, and materials described supra can be used.

In some embodiments, a method of making a fabric of the present disclosure includes: (a) providing a material comprising an outer and an inner surface, the inner surface having one or more first regions and one or more second regions; (b) screen printing a hydrophobic material onto one or more first regions of the inner surface; (c) screen printing a hydrophilic material onto one or more second regions of the inner surface, wherein the first regions and the second regions are different; and (d) screen printing a hydrophobic material onto the outer surface. Thus, the fabric includes an outer surface comprising a hydrophobic material and an inner surface comprising one or more first regions comprising a hydrophobic material and one or more second regions comprising a hydrophilic material, wherein the one or more first regions and the one or more second regions are different. Without wishing to be bound by theory, it is thought that printing both hydrophilic and hydrophobic materials onto the same inner surface achieves greater wettability contrast. In some embodiments, the hydrophobic materials of the outer and inner surfaces contact each other. In some embodiments, the outer surface comprises about 50% of the total thickness of the fabric, and the inner surface comprises about 50% of the total thickness of the fabric. In some embodiments, the ratio of the thickness of the outer surface to the thickness of the inner surface is between about 0.1 to about 10. Any of the patterns, outer surfaces, inner surfaces and regions thereof, and materials described supra can be used.

In some embodiments, a fabric of the present disclosure has three layers. A variety of methods, e.g., as described infra, can be used to generate these fabrics. In some embodiments, the three-layered fabrics comprise an outer surface comprising a hydrophobic material, a middle hydrophilic layer, and an inner surface comprising one or more regions comprising a hydrophobic material and one or more different regions comprising a hydrophilic material.

In some embodiments, a method of making a fabric with three layers includes: (a) providing a first, a second, and a third hydrophilic material, wherein each of the first, second, and third hydrophilic materials comprise an outer and an inner surface, the inner surface of the second hydrophilic comprising one or more first regions and one or more second regions; (b) screen printing a hydrophobic material onto the outer surface of the first hydrophilic material to cover the outer surface; (c) screen printing a hydrophobic material onto one or more first regions of the inner surface of the second hydrophilic material, (d) affixing the inner surface of the first hydrophilic material to the third hydrophilic material; and (e) affixing the outer surface of the second hydrophilic material to the third hydrophilic material. Thus, the three-layered fabric includes an outer surface comprising a hydrophobic material, a middle hydrophilic layer, and an inner surface comprising one or more first regions comprising the first hydrophobic materials and one or more second regions comprising the hydrophilic material, wherein the one or more first regions and one or more second regions are different. In some embodiments, the first, second, and third hydrophilic materials comprise the same material. In some embodiments, the first, second, and third hydrophilic materials comprise different materials. In some embodiments, the hydrophobic materials in (b) and (c) are the same. In some embodiments, the hydrophobic materials in (b) and (c) are different. Any of the patterns, outer surfaces, inner surfaces and regions thereof, affixtures, and materials described supra can be used. The process described in (b) is similar to process 700 in FIGS. 7A & 7B, while the process described in (c) is similar to process 720 in FIGS. 7C & 7D, except that in this embodiment two different materials are printed (unlike the one material 702 that is used in both processes 700 and 720).

In some embodiments, the first hydrophilic material comprises about 30% to about 45%, the second hydrophilic material comprises about 30% to about 45%, and the third hydrophilic material comprises about 10% to about 40% of the total thickness of the fabric. In some embodiments, the ratio of the thickness of the first hydrophilic material to the thickness of the second hydrophilic material is between about 0.1 to about 10, and the ratio of the thickness of the second hydrophilic material to the thickness of the third hydrophilic material is between about 1 to about 5.

In some embodiments, a method of making a fabric with three layers includes: (a) providing a first hydrophobic material, a second hydrophobic material, and a first hydrophilic materials, wherein each of the first and second hydrophobic materials and the first hydrophilic material comprise an inner and an outer surface the inner surface of the second hydrophobic material comprising one or more first regions and one or more second regions; (b) screen printing a second hydrophilic material onto one or more first regions of the inner surface of the second hydrophobic material; (c) affixing the first hydrophilic material to the outer surface of the second hydrophobic material; and (d) affixing the first hydrophilic material to the first hydrophobic material. Thus, the three-layered fabric includes an outer surface comprising a hydrophobic material, a middle hydrophilic layer, and an inner surface comprising one or more first regions comprising the first hydrophobic materials and one or more second regions comprising the hydrophilic material, wherein the one or more first regions and the one or more second regions are different. Any of the patterns, outer surfaces, inner surfaces and regions thereof, affixtures, and materials described supra can be used. In some embodiments, the first hydrophobic material comprises about 30% to about 45%, the middle hydrophilic material comprises about 10% to about 40%, and the second hydrophobic material comprises about 30% to about 45% of the total thickness of the fabric. In some embodiments, the ratio of the thickness of the first hydrophobic material to the thickness of the second hydrophobic material is between about 0.1 to about 10, and the ratio of the thickness of the second hydrophilic material to the thickness of the first hydrophilic material is between about 1 to about 5.

In some embodiments, a method of making a fabric with three layers includes: (a) providing a first material, a second material, and a hydrophilic material, wherein each of the first and second materials and the hydrophilic material comprise an inner and an outer surface wherein the inner surface of the second material comprises one or more first regions and one or more second regions; (b) screen printing a hydrophobic material onto one or more first regions of the inner surface of the second material; (c) screen printing a hydrophilic material onto one or more second regions of the inner surface of the second material; (d) screen printing a hydrophobic material onto the outer surface of the first material; (e) affixing the hydrophilic material to the inner surface of the first material; and (f) affixing the hydrophilic material to the outer surface of the second material. Thus, the three-layered fabric includes an outer surface comprising a hydrophobic material, a middle hydrophilic layer, and an inner surface comprising one or more first regions comprising the first hydrophobic materials and one or more second regions comprising the hydrophilic material, wherein the one or more first regions and the one or more second regions are different. In some embodiments, the hydrophobic materials in (b) and (d) are the same. In some embodiments, the hydrophobic materials in (b) and (d) are different. Any of the patterns, outer surfaces, inner surfaces and regions thereof, affixtures, and materials described supra can be used. In some embodiments, the first material comprises about 30% to about 45%, the hydrophilic material comprises about 10% to about 40%, and the second material comprises about 30% to about 45% of the total thickness of the fabric. In some embodiments, the ratio of the thickness of the first material to the thickness of the second material is between about 0.1 to about 10, and the ratio of the thickness of the second material to the thickness of the hydrophilic material is between about 1 to about 5.

Alternatively, a fabric of the present disclosure can be fabricated by knitting. In some embodiments, a method of making a fabric includes: (a) knitting an outer layer of the fabric using a hydrophobic yarn; (b) knitting a first region of the inner layer of the fabric using a hydrophobic yarn; and (c) knitting a second region of the inner layer of the fabric using a hydrophobic yarn. Thus, a fabric is made comprising an outer surface comprising a hydrophobic material, and an inner surface comprising one or more first regions comprising the first hydrophobic materials and one or more second regions comprising the hydrophilic material, wherein the one or more first regions and the one or more second regions are different.

Various types of knitting can be used in the methods of the present disclosure in any combination. In some embodiments, one or more of the outer layer, first region of the inner layer, and second region of the inner layer are knitted by warp knitting. In some embodiments, one or more of the outer layer, first region of the inner layer, and second region of the inner layer are knitted by weft knitting. In some embodiments, the first region of the inner layer and the second region of the inner layer are knitted in alternating fashion. In some embodiments, the inner layer and the outer layer are connected using a hydrophobic tie-in yarn. In some embodiments, the inner layer and the outer layer are connected across their entire surfaces, while in other embodiments, the hydrophobic tie-in yarn connects the inner and outer layers with individual loops at one or more discrete points (e.g., at one or more edges of the fabric).

In some embodiments, a double needle circular knitting machine is used to knit a multi-layered structure with an outer layer that is knit on the dial using hydrophobic yarns, and an inner layer that is knit on the cylinder wherein each course uses either hydrophobic or hydrophilic yarns that are alternated to produce a pattern. In some embodiments, hydrophobic tie-in yarn is used to connect the outer layer to the inner layer. In some embodiments, the first region of the inner layer and the second region of the inner layer are knitted in alternating fashion.

Figure 8A:
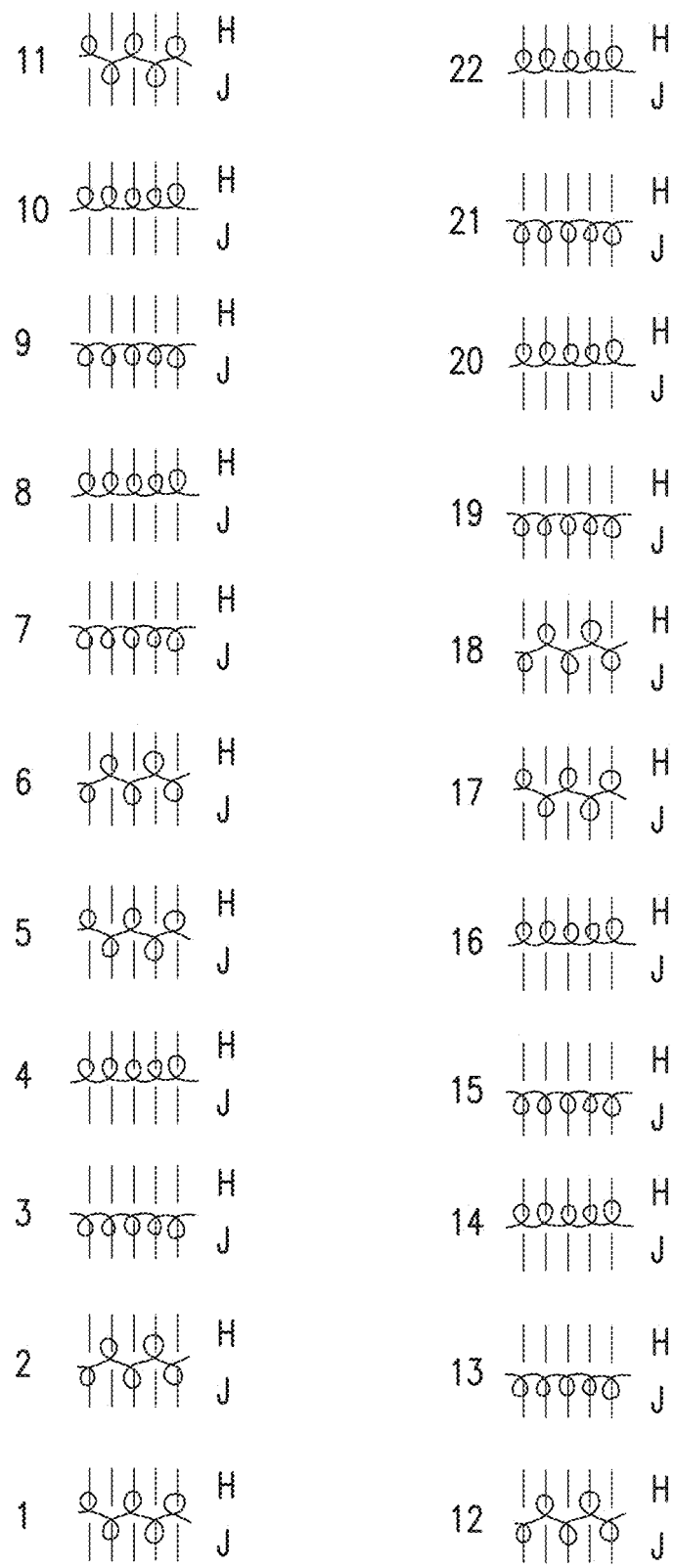
FIGS. 8A-8C illustrates an exemplary process for producing fabrics with improved moisture management by knitting, in accordance with some embodiments.
Figure 8B:
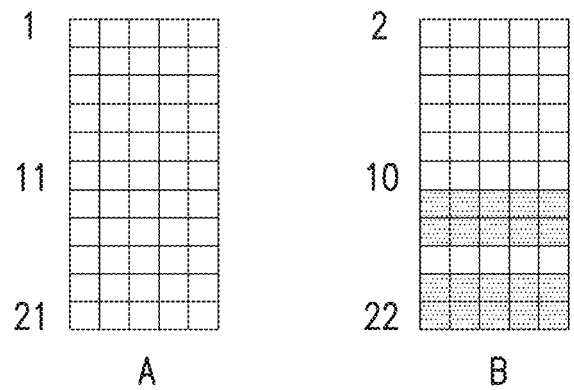
Figure 8C:
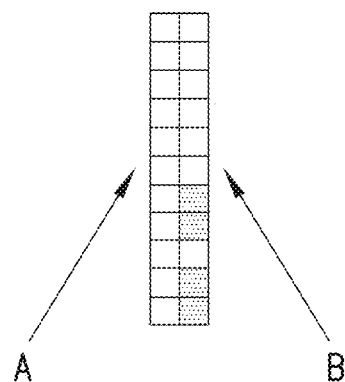

An exemplary knitting diagram for producing a fabric of the present disclosure using a double needle circular knitting machine is provided in FIGS. 8A, 8B and 8C. In FIG. 8A, the FEED panels show the stitch pattern, cylinder is shown as H and dial as J. Loops in the diagram indicate a knit stitch, and the directionality of the loop indicates in which layer the knit stitch is made. Loops facing down, as in FEED 3, indicate stitches made on the dial that form the outer layer of the fabric (i.e., the layer facing away from the wearer when the fabric of the present disclosure forms part of a garment). Loops facing up, as in FEED 4, indicate stitches made on the cylinder that form the inner layer of the fabric (i.e., the layer in contact with the skin of the wearer when the fabric of the present disclosure forms part of a garment). When loops are depicted as alternating down and up between the dial and the cylinder, the stitches depicted are the tie-in stitches that keep the inner and outer layers of the fabric together without an obvious gap in between. In this example, FEEDS 14, 16, 20, and 22 are all knitted on the cylinder with hydrophilic yarns, while the remaining FEEDS 1-13, 15, 17-19 and 21 all use hydrophobic yarns. As a result, the inner surface of a fabric (the visible surface of the inner layer) produced using this diagram appears as depicted in the Visual Knit Diagram shown in FIG. 8B. Here, a pattern of hydrophobic regions (seen here as white lines) alternating with hydrophilic regions (seen here as shaded lines) is shown. In contrast, the outer surface A of the fabric (the visible surface of the outer layer) only has a hydrophobic region. The cross-section of a fabric produced using this diagram is shown in the Vertical Cross-Section shown in FIG. 8C, which shows that the outer A layer (and by extension the outer surface) is hydrophobic, while the inner B layer has an alternating pattern of hydrophobic and hydrophilic regions.

Figure 9:
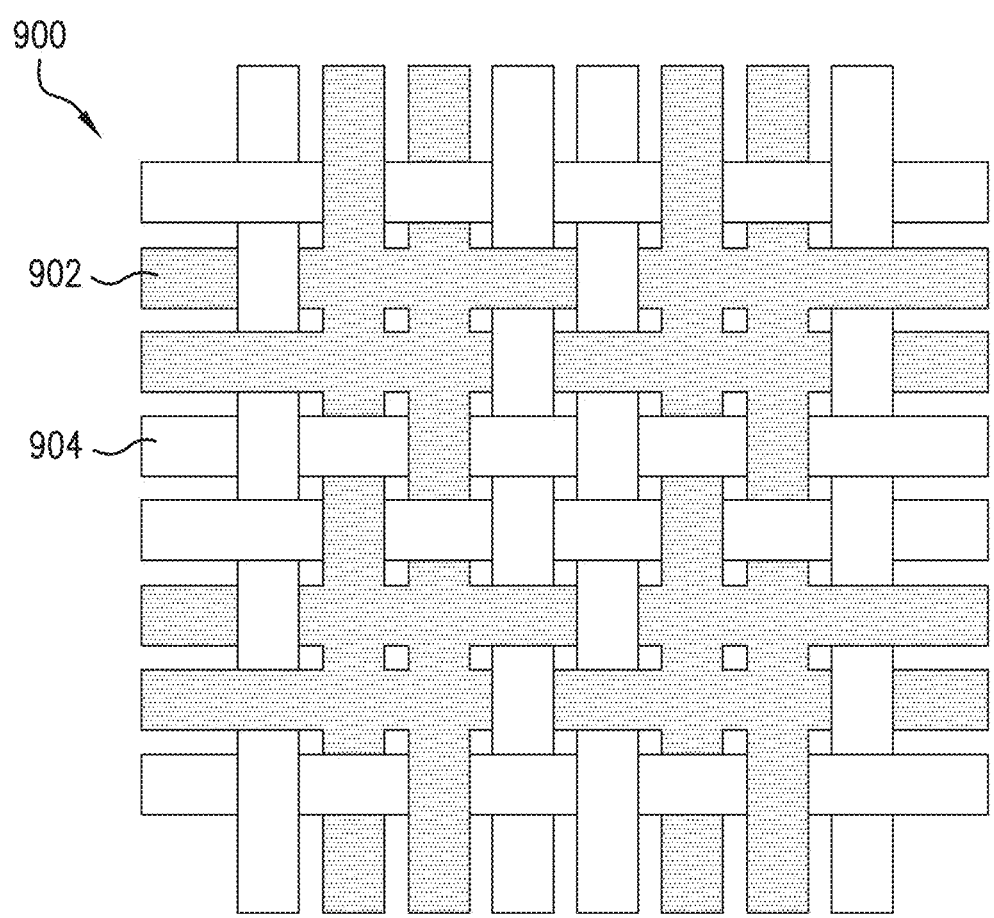
FIG. 9 illustrates an exemplary process for producing fabrics with improved moisture management by weaving, in accordance with some embodiments.

In some embodiments, a method of making a fabric includes: (a) weaving hydrophilic and hydrophobic yarns together to form a pattern with interspersed hydrophilic and hydrophobic regions; and (b) applying a hydrophobic coating to an outer surface of the woven fabric. Thus, a fabric is produced which comprises an outer layer comprising hydrophobic material and an inner layer comprising a hydrophobic region interspersed with hydrophilic regions. Weave patterns can include, without limitation, a simple plain weave or a complicated jacquard weave. An example of a weave pattern is depicted in FIG. 9, which illustrates a fabric section 900 with a weave pattern of interspersed hydrophilic yarns 902 and hydrophobic yarns 904. In some embodiments, an automated weaving machine can be used to weave the fabric. Automated weaving machines can include, without limitation, rapier, jacquard, shuttle, projectile, water jet, and air jet. In some embodiments, a hand loom can be used to weave the fabric.

In some embodiments, a method of making a fabric includes: (a) providing a hydrophobic material; (b) providing a fabric comprising an inner surface comprising one or more first regions comprising a hydrophobic material and one or more second regions comprising a hydrophilic material, wherein the one or more first regions and the one or more second regions are different; and (c) affixing the hydrophobic material to the fabric. Thus, a fabric is produced comprising an outer surface comprising a hydrophobic material and an inner surface comprising one or more first regions comprising a hydrophobic material and one or more second regions comprising a hydrophilic material. Any of the patterns, outer surfaces, inner surfaces and regions thereof, affixtures, and materials described supra can be used. For example, the hydrophobic material can be affixed to the fabric by one or more of: stitching, bonding, adhesion, lamination, or a combination thereof.

In some embodiments, a method of making a fabric includes: (a) providing a hydrophobic material and a hydrophilic material; (b) providing a fabric comprising an inner surface comprising one or more first regions comprising a hydrophobic material and one or more second regions comprising a hydrophilic material, wherein the one or more first regions and the one or more second regions are different; (c) affixing the hydrophobic material to the hydrophilic material; and (d) affixing the hydrophilic material to the fabric. Thus, a fabric is produced comprising an outer surface comprising a hydrophobic material and an inner surface comprising one or more first regions comprising a hydrophobic material and one or more second regions comprising a hydrophilic material. Any of the patterns, outer surfaces, inner surfaces and regions thereof, affixtures, and materials described supra can be used. For example, the hydrophobic material and/or hydrophilic materials can be affixed by one or more of: stitching, bonding, adhesion, lamination, or a combination thereof.

EXAMPLES

The present disclosure will be more fully understood by reference to the following example. It should not, however, be construed as limiting the scope of the present disclosure. It is understood that the examples and embodiments described herein are for illustrative purposes only and that various modifications or changes in light thereof will be suggested to persons skilled in the art and are to be included within the spirit and purview of this application and scope of the appended claims.

Example 1: Moisture Control Behavior Comparison

Various patterns were examined for their moisture control properties, as shown in FIGS. 10A-10G. All six patterned samples (for experimental patterns, see FIGS. 10A-10F) had partially hydrophobic inner surfaces, completely hydrophobic outer surfaces, and identical hydrophilic surface areas (samples were 10 cm by 10 cm cut from 100% polyester interlock, machine screen-printed with a high viscosity hydrophobic ink using an 160 mesh size screen on the inner and outer surfaces to pattern a 50 $cm^2$ inner surface area). Three patterns (FIGS. 10A-10C) were designed to have isolated hydrophilic areas, while the other three patterns (FIGS. 10D-10F) were designed to have connected hydrophilic areas that allowed moisture to move over the whole hydrophilic surface area of the pattern. The control pattern sample (see FIG. 10G) had a completely hydrophilic inner surface and a completely hydrophobic outer surface (see, e.g., Schoeller 3XDry® technology; sample was 10 cm by 10 cm cut from 100% polyester interlock, machine screen-printed with a high viscosity hydrophobic ink using an 160 mesh size screen on the outer surface to pattern a 100 $cm^2$ inner surface area). Some patterns (FIGS. 10D-10F) showed improved moisture control properties as compared to other patterns (FIGS. 10A-10C) or a control pattern (FIG. 10G), as demonstrated below.

The samples were evaluated using two dry time testing protocols: 1) maximum saturation, and 2) under-saturation with a fixed volume. For both protocols, the samples were attached to a wire mesh frame and placed vertically to simulate the vertical drying environment of a garment on a body. Samples were initially weighed dry, and then weighed after water exposure. These two measurements were used to calculate wet pick up (WPU), which is the ratio of the weight of the water picked up to the initial weight of the dry fabric. Periodic measurements were taken as the samples dried until the samples reached their initial dry weight, and these measurements were used to calculate total dry time. Initial WPU and total dry time were measured and calculated for each sample.

For the maximum saturation protocol, all samples were submerged in distilled water for 5 minutes to achieve complete saturation. Then the samples were removed from the water and hung vertically for 1 minute to allow excess water to drain. At 1 minute, the weight of each sample was recorded, and this measurement was used to calculate initial WPU. Further weight measurements were taken as the samples dried in an average environment of 45% relative humidity and 21.8° C., and these measurements were used in recording and calculating total dry time.

Figure 10A:
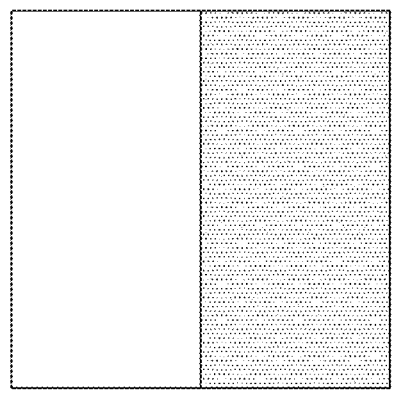
FIGS. 10A-10F illustrate exemplary patterns in which the shaded areas indicate hydrophilic regions and the white areas indicate hydrophobic regions.
Figure 10B:
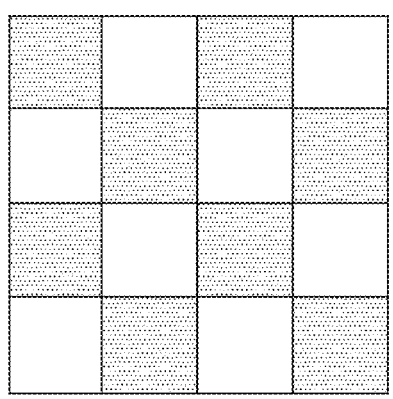
Figure 10C:
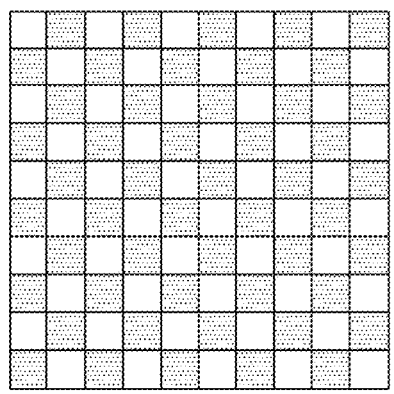
Figure 10D:
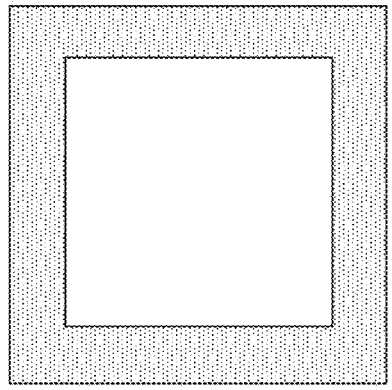
Figure 10E:
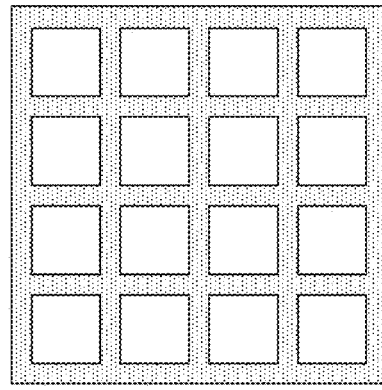
Figure 10F:
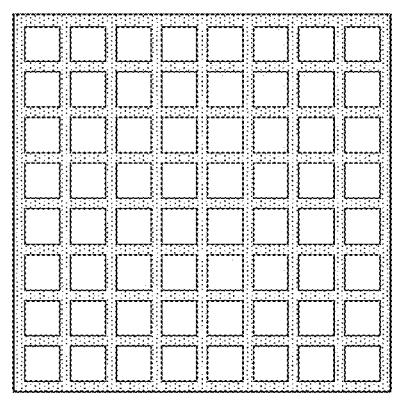
Figure 10G:
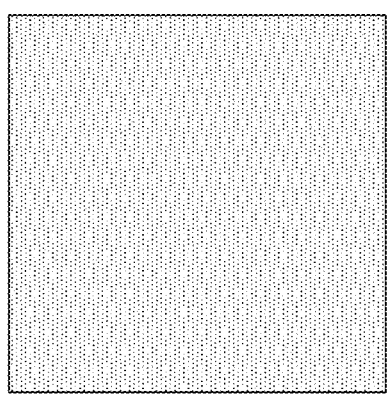
FIG. 10G illustrates a control pattern in which the shaded area indicates a hydrophilic region.
Figure 11:
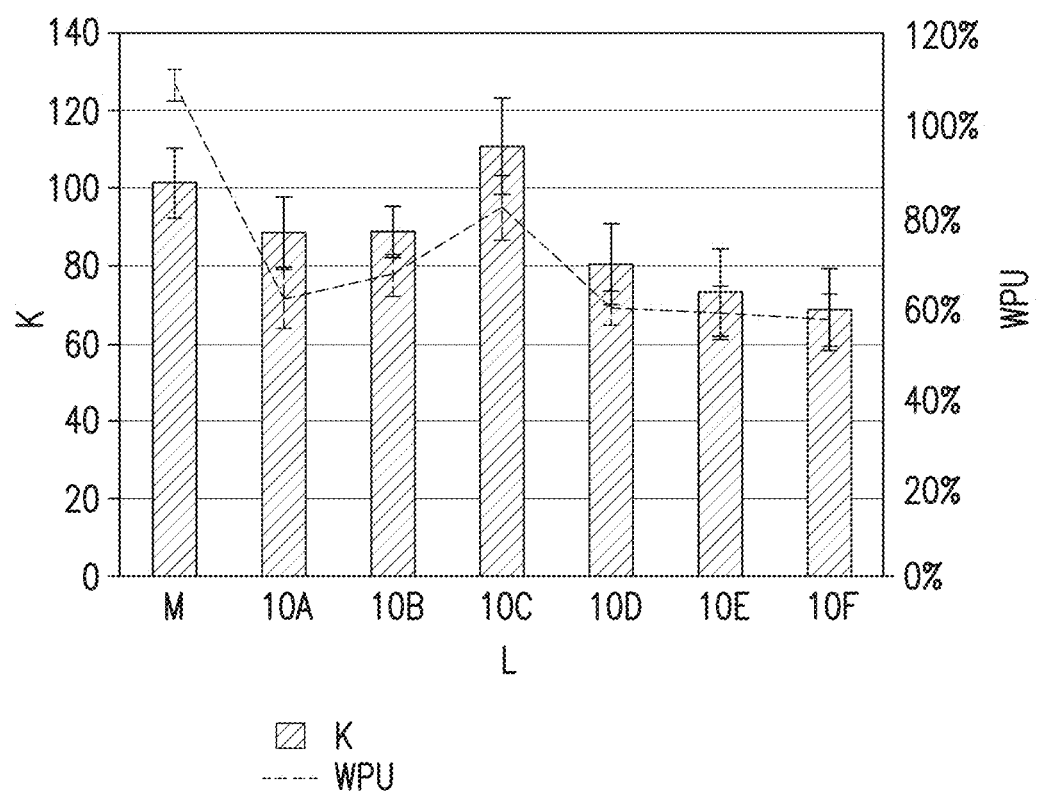
FIG. 11 demonstrates the maximum saturation test results of exemplary patterns of the present disclosure (FIGS. 10A-10F), in accordance with some of the embodiments, as compared to a control pattern (FIG. 10G). 10A refers to the pattern shown in FIG. 10A, 10B refers to the pattern shown in FIG. 10B, C refers to the pattern shown in FIG. 10C, 10D refers to the pattern shown in FIG. 10D, 10E refers to the pattern shown in FIG. 10E, 10F refers to the pattern shown in FIG. 10F, and M refers to the pattern shown in FIG. 10G.
Figure 12:
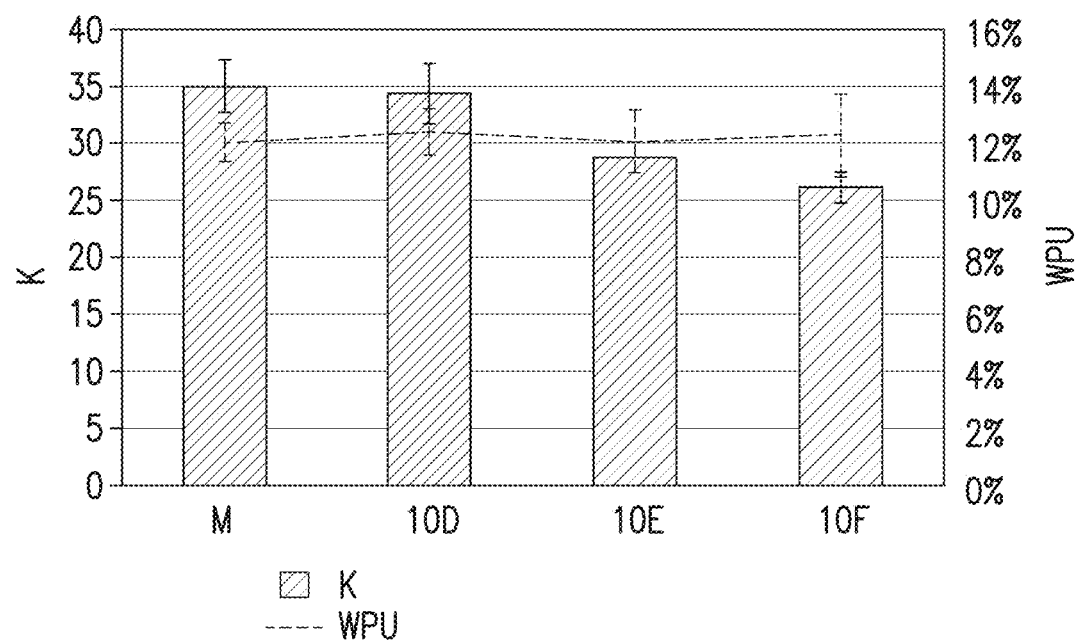
FIG. 12 demonstrates the under saturation dry time test results of exemplary patterns of the present disclosure (FIGS. 10D-10F), in accordance with some of the embodiments, as compared to a control pattern (FIG. 10G). 10D refers to the pattern shown in FIG. 10D, 10E refers to the pattern shown in FIG. 10E, 10F refers to the pattern shown in FIG. 10F, and M refers to the pattern shown in FIG. 10G.

FIGS. 11 & 12 demonstrate the improved moisture control behavior of some exemplary patterns on the inner surface of an exemplary fabric as disclosed herein. The results from the maximum saturation protocol showed that hydrophobic regions on the inner surface tend to reduce the dry time of the fabric, and that pattern type affects the dry time of the fabric. FIG. 11 shows the Maximum Saturation Test Results where the average drying times K in minutes for the patterned samples L (for patterns, see FIGS. 10A-10F, Control C) ranged from 68.7±10.5 minutes (sample pattern shown in FIG. 10F) to 111.0±12.3 minutes (sample pattern shown in FIG. 10C), and most patterned samples dried faster than the control pattern sample (control pattern shown in FIG. 10G), which took an average of 101.5±9.0 minutes to dry. Those samples with patterns designed to have isolated hydrophilic areas (sample patterns shown in FIGS. 10A-10C) showed a correlation between the pattern design and initial wet pick up WPU, which affected the dry time K. For example, the average WPU of the sample with pattern A, which had large isolated hydrophilic areas (sample pattern shown in FIG. 10A), was 61.5%, whereas the average WPU of the sample with pattern C, which had small isolated hydrophilic areas (sample pattern shown in FIG. 10C), was 81.5%. This higher average WPU correlated with a longer drying time K, and the sample with pattern 10C (sample pattern shown in FIG. 10C) was the only one of the six patterned samples to have a longer dry time (9.38% longer dry time, 27.1% lower initial WPU) than the control pattern sample (control pattern shown in FIG. 10G). Those samples with patterns designed to have connected hydrophilic areas (sample patterns shown in FIGS. 10D-10F) showed lower initial WPU and faster dry times K than the samples with patterns designed to have isolated hydrophilic areas (sample patterns shown in FIGS. 10A-10C). The sample with pattern 10F (sample pattern shown in FIG. 10F) dried the fastest; it was 14.8% faster to dry than the sample with pattern 10D (sample pattern shown in FIG. 10D) with only 2.5% less initial WPU. In comparison to the control pattern sample (sample pattern shown in FIG. 10G), the sample with pattern 10F (sample pattern shown in FIG. 10F) dried 32.8 minutes (32.3%) faster.

These results suggest that isolated hydrophilic areas are able to reduce drying times when they are larger, as in patterns 10A and 10B (shown in FIGS. 10A & 10B), but are not effective in reducing drying time when isolated hydrophilic areas are small, as in pattern 10C (shown in FIG. 10C). These results also indicate that connected hydrophilic areas (shown in FIGS. 10D-10F) help to reduce the dry times of the fabrics at the same wet pick up. Overall, the results show that patterning inner surfaces with hydrophilic areas is advantageous in reducing drying time.

For the under-saturation protocol the Under Saturation Dry Time Results are shown in FIG. 12, 7 droplets (0.23 mL) of water were placed on the center of the inner surface of samples with patterns 10D-10F (sample patterns shown in FIGS. 10D-10F) and the control pattern sample M (control pattern shown in FIG. 10G) by pipet. The samples were left horizontal for 1 minute, after which they were weighed, and this measurement was used to calculate initial WPU. Then the samples were hung vertically, measurements were taken periodically from 1 minute until the samples returned to their initial dry weight, and these measurements were used in recording and calculating total dry time.

The results from the under-saturation protocol showed that at low saturation levels, an increased number of connected hydrophilic areas made the drying rate faster (see FIG. 12). The average drying times K (in minutes) for the patterned samples (sample patterns shown in FIGS. 10D-10F) ranged from 26.1±1.3 minutes (sample pattern shown in FIG. 10F) to 34.4±2.6 minutes (sample pattern shown in FIG. 10D), and all patterned samples dried faster than the control pattern sample (control pattern shown in FIG. 10G), which took an average of 35.0±2.3 minutes to dry. The sample with pattern 10F (sample pattern shown in FIG. 10F) dried the fastest of the three patterned samples, and 25.4% faster than the control pattern sample (control pattern shown in FIG. 10G). Overall, the results showed that patterning inner surfaces with connected hydrophilic areas is advantageous in reducing drying time K.

Figure 13A:
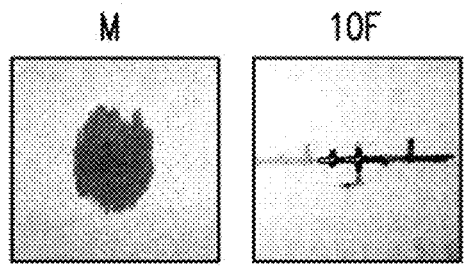
FIGS. 13A-13F demonstrate the improved moisture control of an exemplary pattern of the present disclosure (FIG. 10F), in accordance with some of the embodiments, as compared to a control pattern (FIG. 10G). Design 10F refers to the pattern shown in FIG. 10F, and M refers to the pattern shown in FIG. 10G.
Figure 13B:
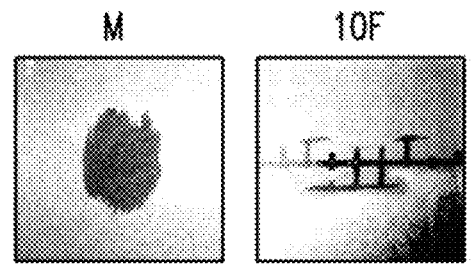
Figure 13C:
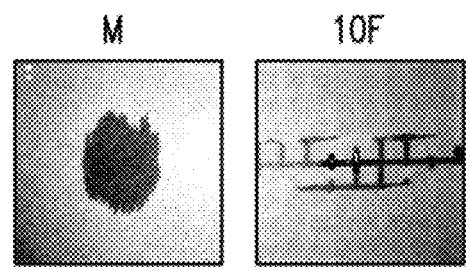
Figure 13D:
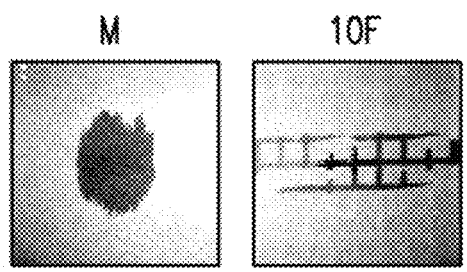
Figure 13E:
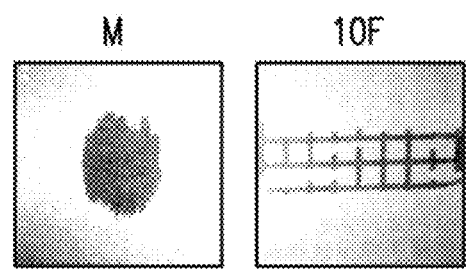
Figure 13F:
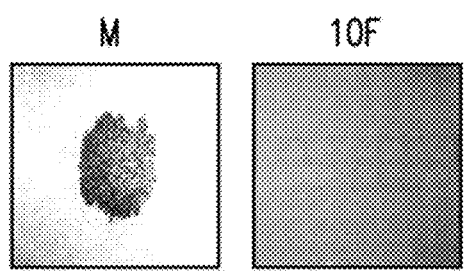

The drying process of the sample with pattern 10F as compared to the drying process of the control pattern sample during the under-saturation protocol was imaged over the course of 40 minutes and is shown in FIGS. 13A-13F. The initial image FIG. 13A shows the restricted area of moisture on the sample with pattern 10F (sample pattern shown in FIG. 10F) just after droplet application, as well as the spot on the control pattern sample (control pattern shown in FIG. 10G) that resulted from droplet application for one (1) minute. In the following images (FIG. 13B (results after two (2) minutes), FIG. 13C (results after three (3) minutes), FIG. 13D (results after four (4) minutes), FIG. 13E (results after five (5) minutes), FIG. 13F (results after forty (40) minutes), the spread of the moisture through the connected hydrophilic areas can be seen on the sample with pattern 10F (sample pattern shown in FIG. 10F), whereas the control pattern (control pattern shown in FIG. 10G) sample spot remains the same size. In the final image (FIG. 13F), the sample with pattern 10F (sample pattern shown in FIG. 10F) appears dry, while the control pattern sample (control pattern shown in FIG. 10G) remains wet. These results demonstrate that moisture spreads further away from the source point and dries faster when a fabric is patterned with connected hydrophilic areas.

In summary, the results demonstrate the unique properties of the improved moisture control behavior of some exemplary patterns on the inner surface of an exemplary fabric disclosed herein, as compared to existing fabrics. Most of the samples patterned with the exemplary patterns disclosed herein were able to pick up less moisture initially and were able to dry faster in the maximum saturation test than the control pattern sample. Furthermore, the samples patterned with the exemplary patterns disclosed herein were able to dry faster than the control pattern sample when the same amount of moisture was initially applied in the under-saturation test. These results indicate that the application of patterned hydrophilic areas interspersed with patterned hydrophobic areas on the inner surface of a material, in particular when applied in a pattern wherein the hydrophilic areas are connected, results in faster drying times and therefore improved moisture control.

Example 2: Wear Trial on Human Body

A wear trial was conducted by a male athlete wearing a prototype shirt 1400 (100% cotton, single jersey knit fabric, fabric weight 150 g/m$^2$) that was treated with the improved moisture control fabric of the present disclosure on the inside of a shirt on one side 1410. The prototype shirt was constructed using a cotton t-shirt. First, the right sleeve of the t-shirt was removed. Second, the outer surface of the right sleeve and the right side of the shirt were covered by a completely hydrophobic coating to about 50% penetration. Third, the coated t-shirt and sleeve were sent through an oven to dry the coating. Fourth, the t-shirt and the sleeve were turned inside out and printed with a hydrophobic pattern (similar to the one depicted in FIG. 4B) surrounded by a hydrophobic barrier (similar to hydrophobic barriers/boundaries 602 and 616 illustrated in FIGS. 6A & 6B). Fifth, the printed t-shirt and sleeve were sent through an oven to completely cure the coatings. Finally, the sleeve was sewn back onto the t-shirt, and the t-shirt was turned right-side out again.

Figure 14A:
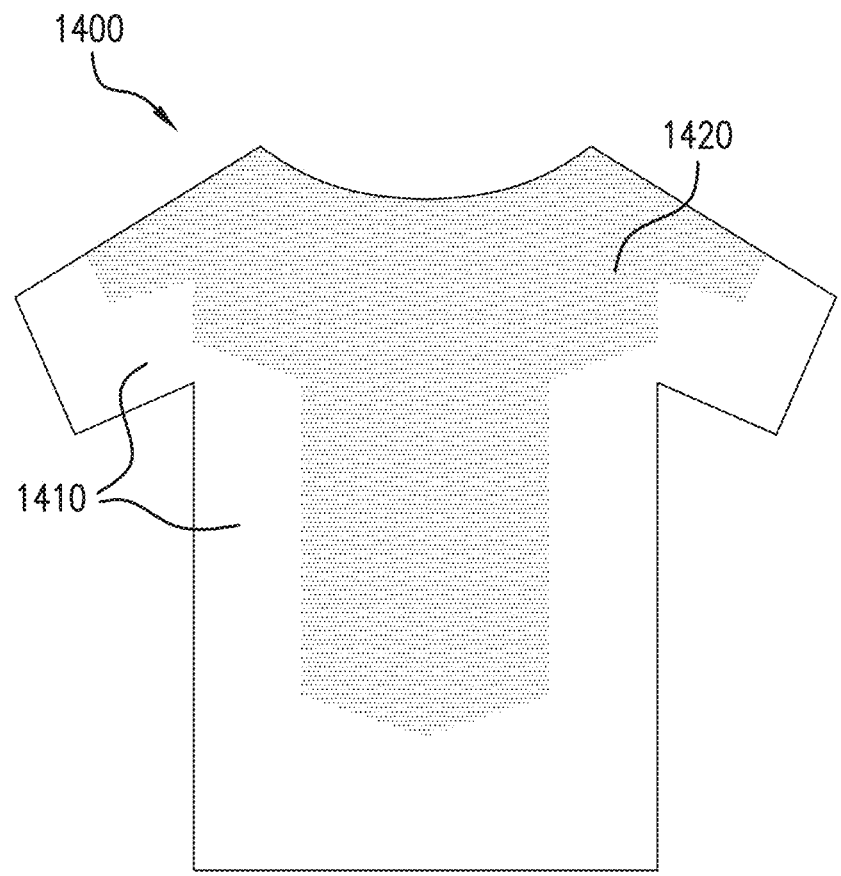
FIGS. 14A-14C illustrate exemplary evaluations of a fabric with improved moisture control, in accordance with some embodiments.
Figure 14B:
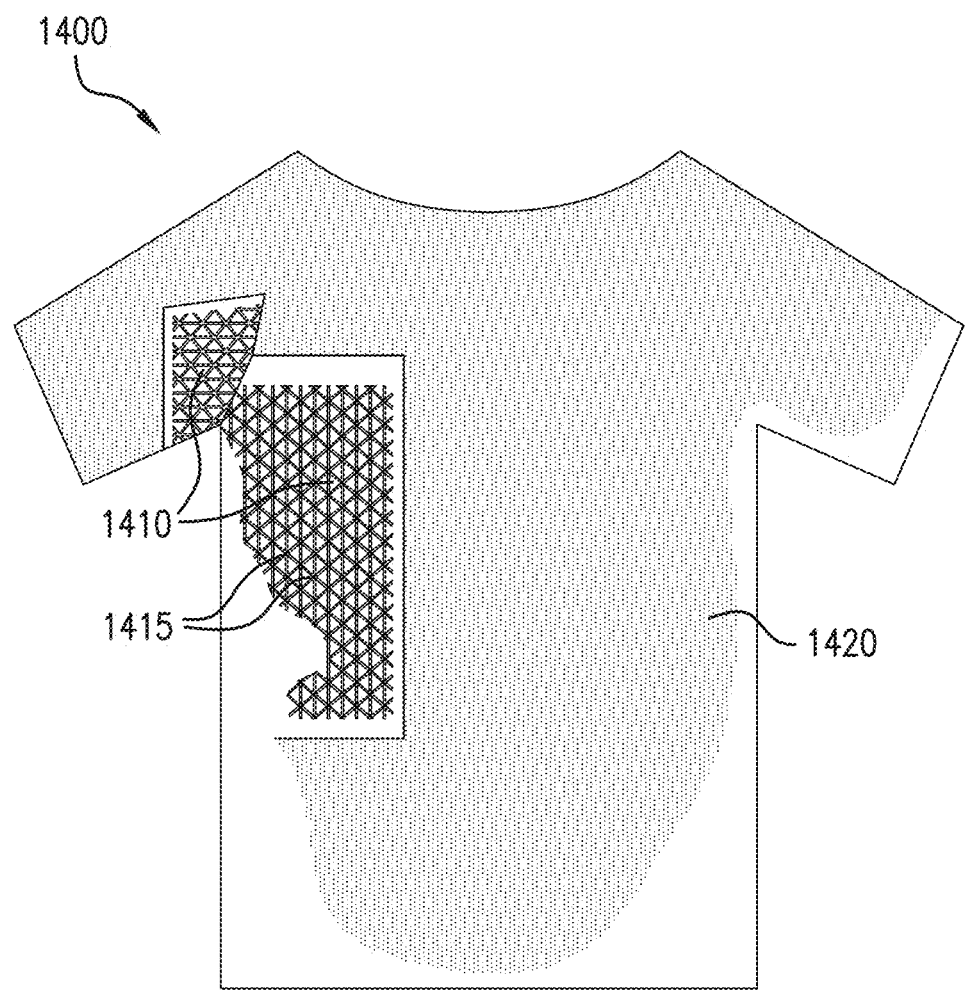

In order to test the shirt, the athlete played an outdoor game of competitive basketball for approximately 1 hour. Pictures were taken during and after the test. During the test, the fabric performed well, maintaining a dry outer surface in the treated area 1410 (FIG. 14A) while the surface of the non-treated fabric region 1420 became wet. After the test, the shirt was removed and turned inside out. In the treated region 1410, only the patterned hydrophilic regions 1415 were found to be wet, while the surrounding area remained dry (FIG. 14B). In the untreated region 1420, the inside of the shirt was as wet as the outside of the shirt (FIG. 14B). These results validate the improved moisture control properties of the fabrics disclosed herein under actual use conditions.

Figure 14C:
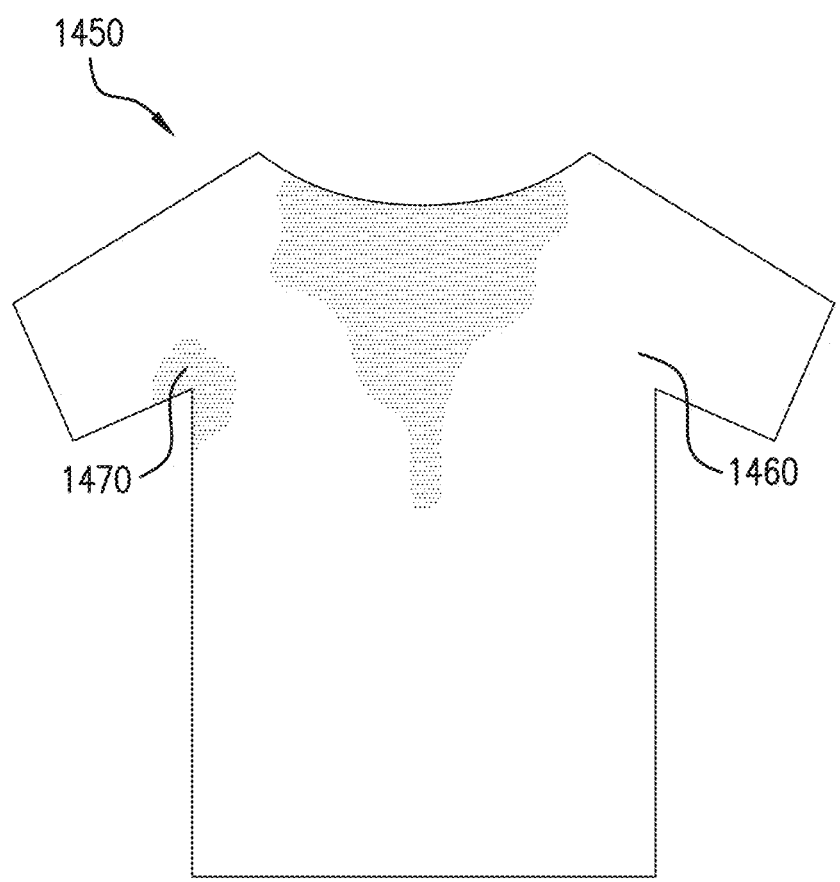

A second wear trial was conducted by a male athlete wearing a prototype shirt (100% cotton, single jersey knit, fabric weight 150 g/m$^2$) as an undershirt under a woven cotton dress shirt 1450. As in the first wear trial, one armpit of the undershirt is composed of a two-layer structure of the improved moisture control fabric 1410 (as shown in FIG. 14C). The other armpit of the undershirt was composed of the same two-layer structure made of the same fabrics, but without the improved moisture control treatment. In order to test the undershirt, the athlete first ran on a treadmill for 10 minutes, then walked quickly on the treadmill for 25 minutes. At the end of the test, pictures were taken to compare the wetness at the armpits of the dress shirt. In the treated region 1460, the armpit remained dry, whereas in the untreated region 1470, the armpit became wet and this resulted in a clear dark mark in the armpit region of the dress shirt.

Although the foregoing descriptions and examples have been described in some detail by way of illustration and example for purposes of clarity of understanding, the descriptions and examples should not be construed as limiting the scope of the present disclosure.

What is claimed is:

1. A garment comprising a fabric, the fabric including:
    an inner surface for facing a wearer's body when the garment is worn; and
    an outer surface opposite to the inner surface, the entire outer surface defining therealong a single region comprising solely a hydrophobic material,
    wherein the inner surface of the fabric defines:
    one or more first regions, wherein the one or more first regions each comprise solely a hydrophobic material, and
    one or more second regions, wherein the one or more second regions each comprise solely a hydrophilic material,
    wherein said one or more first regions defined by said inner surface are in direct contact with said single region defined by said outer surface,
    wherein said one or more second regions defined by said inner surface are in direct contact with said single region defined by said outer surface, and
    wherein said fabric has a structure which keeps moisture from accumulating along said outer surface, thereby preventing perspiration from being seen from outside of said garment wherein the fabric is made of a hydrophilic textile,
    wherein the hydrophobic material of the outer surface forms a hydrophobic coating covering the outer surface of the hydrophilic textile,
    and wherein the hydrophobic material of the one or more first regions of the inner surface forms a hydrophobic coating covering the one or more first regions of the inner surface of the hydrophilic textile.

2. The garment of claim 1, wherein the garment is a shirt, a coat, a dress, a skirt, a sports bra, a sock, an undergarment, pants, or shorts.

3. The garment of claim 1, wherein at least one of the one or more second regions is surrounded by at least one of the one or more first regions.

4. The garment of claim 1, wherein at least one of the one or more first regions is surrounded by at least one of the one or more second regions.

5. The garment of claim 1, wherein either the one or more first regions form a lattice, or the one or more second regions form a lattice.

6. The garment of claim 1, wherein a proportion of a collective surface area of the one or more second regions to a surface area of the entire fabric is about 40% to about 95%.

7. The garment of claim 1, wherein the hydrophilic material of the one or more second regions comprises 5% to 95% of a total thickness of the fabric.

8. The garment of claim 1, wherein the one or more second regions comprise 15% to 85% of an area of the inner surface of the fabric.

9. The garment of claim 1, wherein the hydrophobic material of the outer surface resists a hydrostatic pressure of about 150 pa to about 3 kpa, or the hydrophobic material of the one or more first regions resists a hydrostatic pressure of about 150 pa to about 3 kpa.

10. The garment of claim 1, wherein the hydrophobic material of the outer surface is different from the hydrophobic material of the one or more first regions of the inner surface.

11. The garment of claim 1, wherein the hydrophobic material of the outer surface is the same as the hydrophobic material of the one or more first regions of the inner surface.

12. A method of making a garment, the method comprising:
    providing a hydrophilic fabric having a first side surface and a second side surface opposite to the first side surface;
    applying a first hydrophobic material to the first side surface in order to define a single region therealong that is solely hydrophobic;
    applying a second hydrophobic material to a plurality of selected portions of the second side surface in order to define a plurality of first regions that are solely hydrophobic, wherein a plurality of unselected portions of the second side surface do not receive the second hydrophobic material so as to define a plurality of second regions that are solely hydrophilic,
    wherein said first regions defined by said second side surface of said fabric are in direct contact with said single region defined by said first side surface of said fabric, and said second regions defined by said second side surface of said fabric are in direct contact with said single region defined by said first side surface of said fabric; and
    incorporating the fabric into a garment such that an inner surface of the garment, which is configured to face a wearer's body when the garment is worn, corresponds to the second side surface of the fabric, and an outer surface of the garment, which is configured to face away from the wearer's body, corresponds to the single region defined by the first side surface of the fabric, and
    wherein said method produces said garment with said fabric having a structure which keeps moisture from accumulating along said single region defined by said first side surface, thereby preventing perspiration from being seen from outside of said garment.

13. The method of claim 12, wherein the step of applying the first hydrophobic material includes screen printing a fluoropolymer, silicone, hydrosilicone, fluoroacrylate, or wax on the first side surface of the hydrophilic fabric, or the step of applying the second hydrophobic material includes screen printing a fluoropolymer, silicone, hydrosilicone, fluoroacrylate, or wax on the second side surface of the hydrophilic fabric.

14. The method of claim 12, wherein the first hydrophobic material is applied to the entire first side surface.

* * * * *